US012663947B2

(12) United States Patent
Ono et al.

(10) Patent No.: US 12,663,947 B2
(45) Date of Patent: Jun. 23, 2026

(54) IMAGE PROCESSING APPARATUS, PRINTING SYSTEM, AND NON-TRANSITORY COMPUTER-READABLE STORAGE MEDIUM STORING IMAGE PROCESSING PROGRAM

(71) Applicant: SEIKO EPSON CORPORATION, Tokyo (JP)

(72) Inventors: Takuya Ono, Shiojiri (JP); Takahiro Kamada, Matsumoto (JP); Mitsuhiro Yamashita, Matsumoto (JP); Yuko Yamamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 340 days.

(21) Appl. No.: 18/483,557

(22) Filed: Oct. 10, 2023

(65) Prior Publication Data

US 2024/0126484 A1 Apr. 18, 2024

(30) Foreign Application Priority Data

Oct. 12, 2022 (JP) .................................. 2022-163931

(51) Int. Cl.
| | |
|---|---|
| *G06F 15/00* | (2006.01) |
| *G06F 3/12* | (2006.01) |
| *G06T 15/04* | (2011.01) |
| *G06T 15/50* | (2011.01) |

(52) U.S. Cl.
CPC .......... *G06F 3/1208* (2013.01); *G06F 3/1256* (2013.01); *G06T 15/04* (2013.01); *G06T 15/506* (2013.01)

(58) Field of Classification Search
None
See application file for complete search history.

(56) References Cited

U.S. PATENT DOCUMENTS

| | | | |
|---|---|---|---|
| 2018/0124284 A1 | 5/2018 | Sakai et al. | |
| 2021/0160390 A1* | 5/2021 | Sakai | B41J 3/46 |
| 2021/0197600 A1* | 7/2021 | Tanaka | H04N 1/00344 |

FOREIGN PATENT DOCUMENTS

| | | |
|---|---|---|
| JP | 2018-074339 A | 5/2018 |
| JP | 2019-181863 A | 10/2019 |

* cited by examiner

*Primary Examiner* — Mark R Milia
(74) *Attorney, Agent, or Firm* — Spencer Fane LLP

(57) ABSTRACT

An image processing apparatus sets, when image data expressed in a first color space is converted, using a color conversion profile prepared in advance, into expression in a second color space used in rendering, whether to apply a printing profile including a parameter relating to color development at the time when an image is printed. The image processing apparatus performs color conversion according to the setting of the propriety of the printing profile, generates converted image data, performs, using the converted image data and a necessary parameter, physically-based rendering of a printed printing medium on which the image is printed, and generates a rendering image corresponding to appearance in a virtual space of the printed printing medium. The image processing apparatus displays the rendering image obtained in this way in a form in which a difference in the propriety of the printing profile can be compared.

9 Claims, 19 Drawing Sheets

Figure 9:
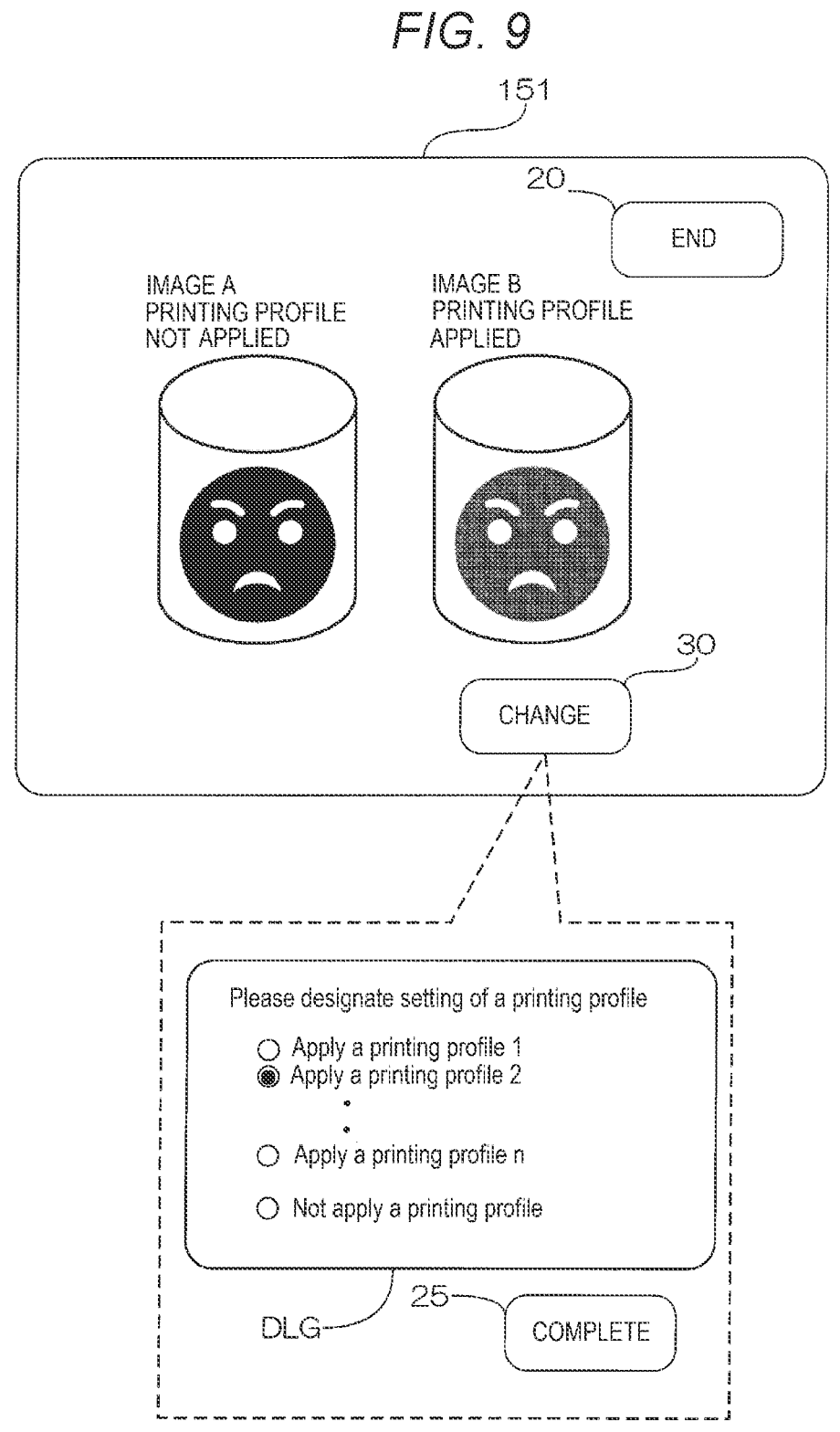

END

IMAGE A
PRINTING PROFILE
NOT APPLIED

IMAGE B
PRINTING PROFILE
APPLIED

30

CHANGE

Please designate setting of a printing profile

○ Apply a printing profile 1
◉ Apply a printing profile 2
  .
  .
○ Apply a printing profile n ○ Not apply a printing profile

DLG          25          COMPLETE

DLGS

| | | PRINTING APPARATUS TYPE | | | |
|---|---|---|---|---|---|
| | | PRINTING APPARATUS Pb | PRINTING APPARATUS Pc | PRINTING APPARATUS Pd | OTHER Pe |
| PRINTING MEDIUM (MEDIUM) TYPE | MEDIA Mb | ● PRINTING PROFILE bb | ○ PRINTING PROFILE bc | ○ PRINTING PROFILE bd | N/A ———— |
| | MEDIA Mc | ○ PRINTING PROFILE cb | ● PRINTING PROFILE cc | ○ PRINTING PROFILE cd | N/A ——— |
| | MEDIA Md | N/A ——— | ○ PRINTING PROFILE dc | ○ PRINTING PROFILE dd | ○ PRINTING PROFILE MANUAL SETTING |

● • • SELECTED

○ • • SELECTABLE

N／A • UN-SELECTABLE

*FIG. 16*

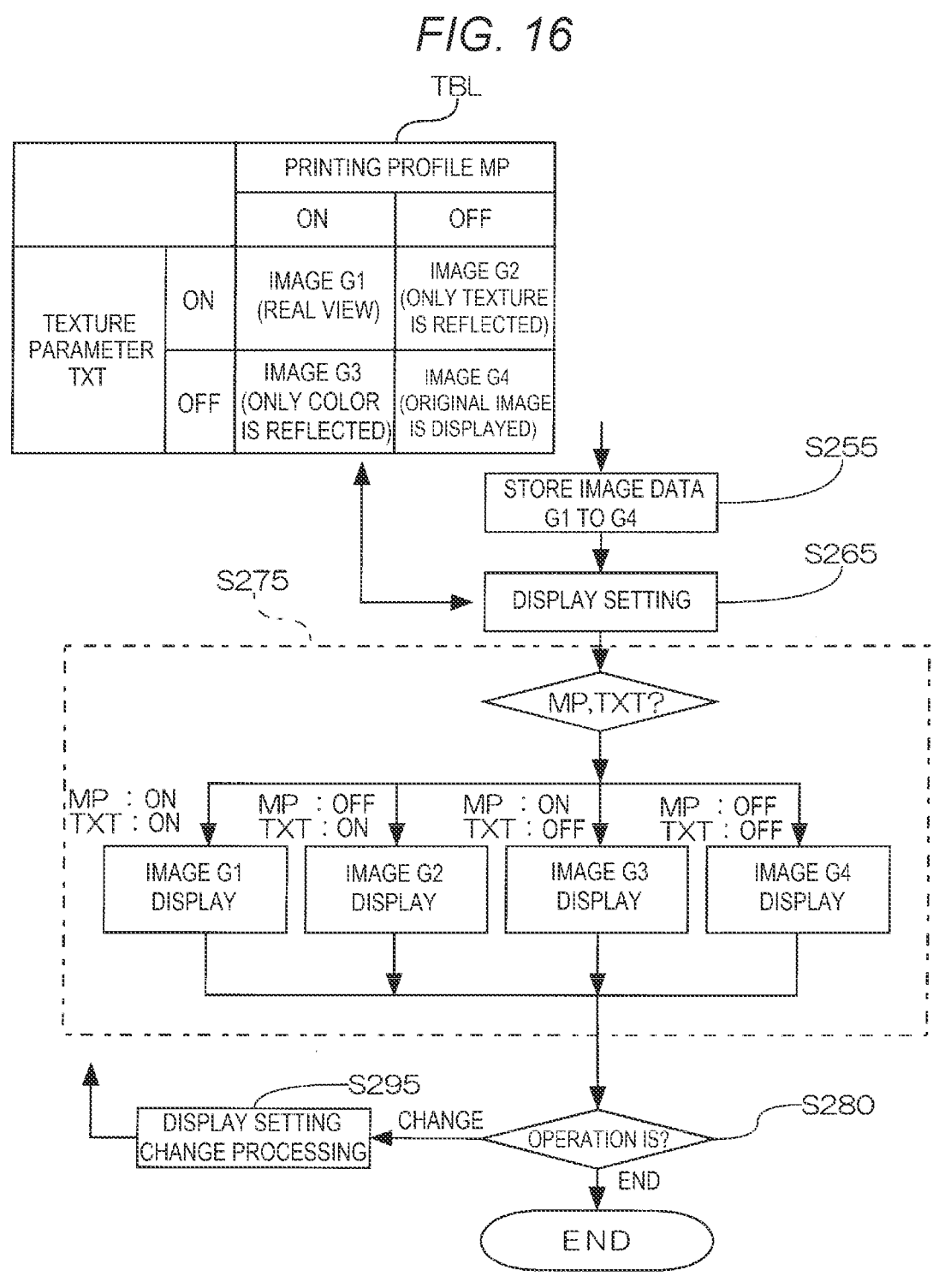

TBL

| | | PRINTING PROFILE MP | |
| --- | --- | --- | --- |
| | | ON | OFF |
| TEXTURE PARAMETER TXT | ON | IMAGE G1 (REAL VIEW) | IMAGE G2 (ONLY TEXTURE IS REFLECTED) |
| | OFF | IMAGE G3 (ONLY COLOR IS REFLECTED) | IMAGE G4 (ORIGINAL IMAGE IS DISPLAYED) |

STORE IMAGE DATA G1 TO G4 — S255

DISPLAY SETTING — S265

S275

MP,TXT?

| MP : ON TXT : ON | MP : OFF TXT : ON | MP : ON TXT : OFF | MP : OFF TXT : OFF |
| --- | --- | --- | --- |
| IMAGE G1 DISPLAY | IMAGE G2 DISPLAY | IMAGE G3 DISPLAY | IMAGE G4 DISPLAY |

S295 — DISPLAY SETTING CHANGE PROCESSING

CHANGE

OPERATION IS? — S280

END

END

FIG. 19

IMAGE PROCESSING APPARATUS, PRINTING SYSTEM, AND NON-TRANSITORY COMPUTER-READABLE STORAGE MEDIUM STORING IMAGE PROCESSING PROGRAM

The present application is based on, and claims priority from JP Application Serial Number 2022-163931, filed Oct. 12, 2022, the disclosure of which is hereby incorporated by reference herein in its entirety.

BACKGROUND

1. Technical Field

The present disclosure relates to an image processing technique that can display how a printing medium is seen.

2. Related Art

Displaying a preview of a printing medium before the printing medium is printed using a printer and a printing machine has been performed. In order to display the preview of the printing medium in appearance close to actual appearance of the printing medium, it is necessary to improve reproducibility of the printing medium considering various conditions such as a tint of a light source. For example, JP-A-2018-74339 (Patent Literature 1) discloses an example in which ON/OFF of a monitor, a printer, and illumination correction can be switched, previews in switched states of these conditions are displayed side by side or switched and displayed.

However, the technique disclosed in Patent Literature 1 only considers correcting a color temperature of a display device according to a tint of a medium. Reproduction of actual appearance of a print is insufficient. For example, a desire of a designer to check a state of a print prior to printing has not been sufficiently met.

SUMMARY

A first aspect of the present disclosure is an aspect as an image processing apparatus that generates a rendering image of a printing medium on which an image is printed. The image processing apparatus includes: an image-data acquiring unit configured to acquire image data, which is data of an input image expressed in a first color space; a printing-profile acquiring unit configured to acquire a printing profile including a parameter relating to color development at a time when the image is printed; a propriety setting unit configured to set, when the image data is converted, using a color conversion profile prepared in advance, into expression in a second color space used in rendering, whether to apply the printing profile; a color conversion unit configured to perform color conversion according to the setting of the propriety of the printing profile and generate converted image data; a rendering executing unit configured to perform, using the converted image data and a parameter necessary to perform physically-based rendering using the printing medium as a three-dimensional (hereinafter described as 3D) object, the physically-based rendering of a printed printing medium on which the image is printed and generate a rendering image corresponding to appearance in a virtual space of the printing medium on which the converted image data is printed; and a display unit configured to display the rendering image in a form in which a difference in the propriety of the printing profile can be compared.

A second aspect of the present disclosure is a configuration as a non-transitory computer-readable storage medium storing an image processing program for generating a rendering image of a printing medium on which an image is printed. The image processing program includes: a first function of acquiring image data, which is data of an input image expressed in a first color space; a second function of acquiring a printing profile including a parameter relating to color development at a time when the image is printed; a third function of setting, when the image data is converted, using a color conversion profile prepared in advance, into expression in a second color space used in rendering, whether to apply the printing profile; a fourth function of performing color conversion according to the setting of the propriety of the printing profile and generating converted image data; a fifth function of performing, using the converted image data and a parameter necessary to perform physically-based rendering using the printing medium as a 3D object, the physically-based rendering of a printed printing medium on which the image is printed and generating a rendering image corresponding to appearance in a virtual space of the printing medium on which the converted image data is printed; and a sixth function of displaying the rendering image in a form in which a difference in the propriety of the printing profile can be compared.

BRIEF DESCRIPTION OF THE DRAWINGS

FIG. 5 is an explanatory diagram showing a relation among a light source, a visual point, an angle of the surface of a 3D object, and the like.

FIG. 9 is an explanatory diagram showing an example of display for comparing processing results.

FIG. 10 is an explanatory diagram showing a difference in an image display result due to presence or absence of application of the printing profile.

FIG. 12 is an explanatory diagram showing a state of selection of a printing profile in the case in which a displayed image is changed or added.

FIG. 16 is an explanatory diagram showing details of main parts of the image display processing routine.

FIG. 19 is a schematic configuration diagram of a printing system in a fourth embodiment.

DESCRIPTION OF EMBODIMENTS

A. First Embodiment (A1) Hardware Configuration

Figure 1:
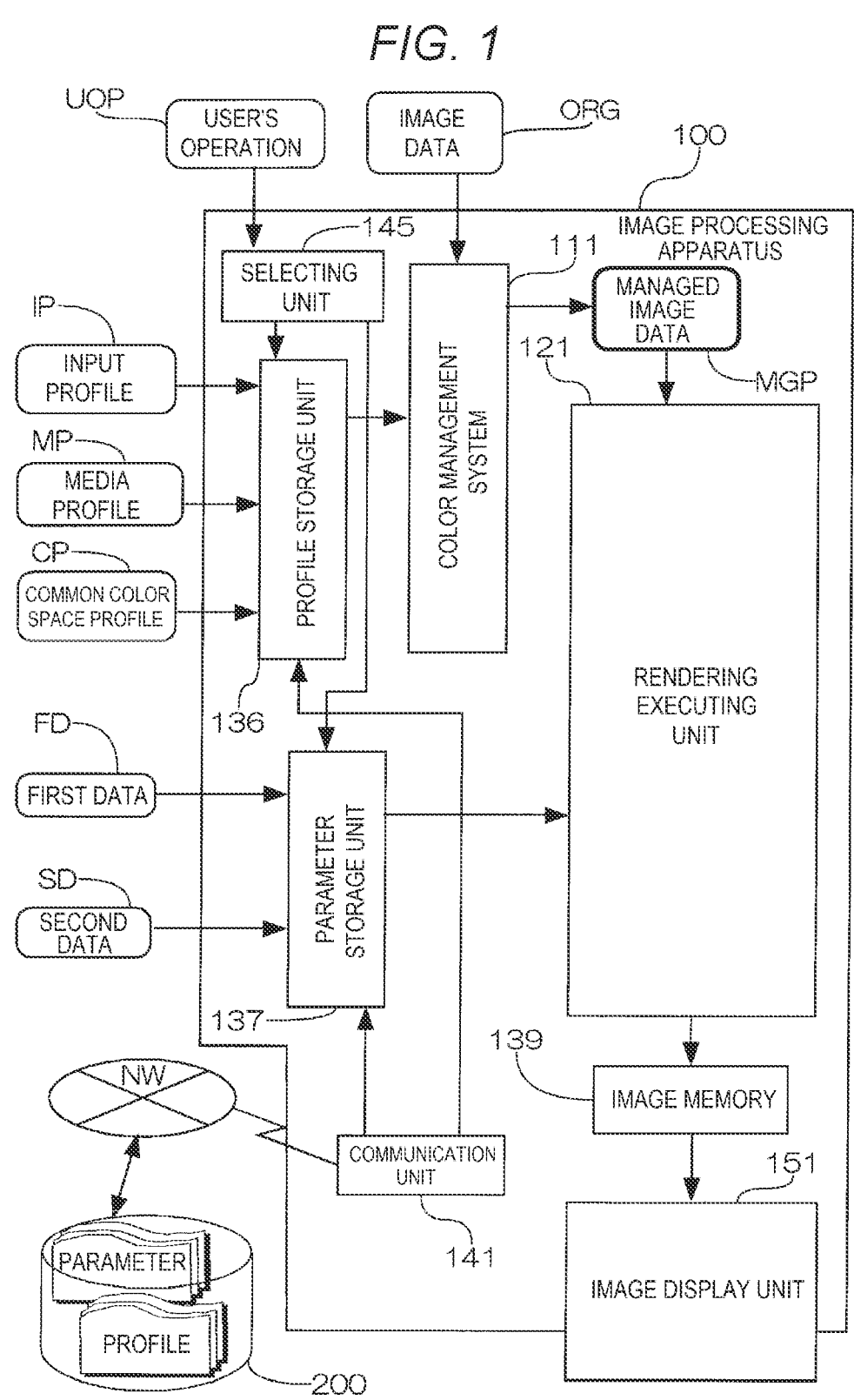
FIG. 1 is a schematic configuration diagram showing an image processing apparatus in an embodiment.

A schematic configuration of an image processing apparatus 100 in a first embodiment is shown in FIG. 1. The image processing apparatus 100 performs image processing for previewing a state in which an image is printed on a predetermined printing medium. The image processing apparatus 100 not only performs the image processing but also displays a result of the processing as a preview image. The image processing apparatus 100 includes, as shown in FIG. 1, a color management system 111 that mainly performs color conversion, a rendering executing unit 121 that executes rendering of a printing medium, a profile storage unit 136 that stores various profiles used for color conversion, a parameter storage unit 137 that stores various parameters used for rendering processing, an image memory 139 that stores an image that is an execution result of the rendering executing unit 121, a communication unit 141 that exchanges data with an external site 200 via a network NW such as the Internet, a selecting unit 145 that receives user's operation UOP, and an image display unit 151 that displays a preview image. Note that a program for performing kinds of processing explained below is stored in a not-shown memory of the image processing apparatus 100. A CPU or a GPU executes the program stored in the memory, whereby the functions of the image processing apparatus 100 are implemented.

The color management system is sometimes abbreviated as CMS below for simplification. The CMS 111 is capable of acquiring image data ORG representing an input image to be printed (hereinafter referred to as original image). The image data ORG may be received by wired or wireless communication from an image forming apparatus that created the image data ORG or may be read from a memory card that stores the image data ORG in a file format. Naturally, the image data ORG may be acquired via a network. Alternatively, the image data ORG may be created in the image processing apparatus 100. When the image data ORG is created in the image processing apparatus 100, in printing, the image data ORG only has to be output to an external printing apparatus by communication or the like.

The CMS 111 converts a color of an original image, which is a target of printing preview, into an object color expressed on a printing medium. Converted image data is referred to as managed image data MGP. Details of CMS processing are explained below. The managed image data MGP is set as texture of a printing medium, which is a 3D object. Input profiles IP, media profiles MP, common color space profiles CP, and the like are input to the CMS 111 via the profile storage unit 136. The profile storage unit 136 is equivalent to a color conversion profile unit that performs at least one of acquisition and setting of a color conversion profile used for color conversion of an image. The input profiles IP are used to perform conversion from a color system on an input side depending on equipment such as RGB data into, for example, L*a*b (hereinafter simply abbreviated as Lab), which is a color system not depending on equipment. The media profiles MP are profiles representing color reproducibility at the time when printing is performed on a specific printing medium by a specific printing apparatus such as a printer under printing conditions such as specific printing resolution and are profiles for converting a color value between the equipment-dependent color system and the equipment-independent color system. The media profiles MP include information such as printing setting of a printing apparatus other than the printing medium. Therefore, when it is attempted to cover all combinations of printing apparatuses (printers), printing media, and printing settings, types of the media profiles MP increase. Therefore, when dependency on printing conditions is small or when it is not desired to increase the number of profiles, the media profiles MP are configured as combinations of printing apparatuses (printers) and printing media.

Characteristics of a printing apparatus and characteristics of a printing medium itself relate to a color of an image on the printing medium (a medium). Therefore, the media profiles MP are hereinafter sometimes referred to as printing profiles MP. Setting about which printing profile MP is used among the printing profiles MP stored in the profile storage unit 136 or setting for not using the printing profiles MP in the CMS 111 is performed by the user's operation UOP via the selecting unit 145. As explained above, the printing profiles MP can be present by the number of printing apparatuses×printing media. Therefore, all what should be done is to store the printing profiles MP having high frequencies of use in the profile storage unit 136 and select the printing profile MP as needed and cause the CMS 111 to refer to the printing profile MP. The printing profiles MP not usually used such as the printing profiles MP having low frequencies of use may be stored in the external site 200 and acquired via the communication unit 141 when necessary.

When the input profile IP is applied to the image data ORG and the printing profile MP is further applied to the image data ORG, a color value in the case of printing under specific printing conditions, that is, a color value depending on a printing apparatus and a printing medium is obtained. When the printing profile MP is applied to this color value of an image to convert an equipment-dependent color system into an equipment-independent color system and the common color space profile CP is further applied to the color value, the image data ORG is converted into expression in a second color space (here, an sRGB color space) used in performing rendering. Since the image data ORG is once converted into the color value depending on the characteristics of the printing apparatus, the printing medium, and the like using the printing profile MP, the image data ORG is converted into a range of an actually printable color value. The common color space profile CP is used to convert image data into a color value of a color space used in the rendering. As a common color space, the sRGB color space is representative but Adobe RGB, Display-P3, or the like may be used.

As explained above, the CMS 111 converts, using the profiles, the image data ORG expressed in the first color space, which is the color system depending on equipment, into the image data (the managed image data) MGP expressed in the sRGB color space, which is the second color space, used in the rendering. Here, the image data after the conversion is not limited to a color value in the sRGB color space and may be image data expressed in any color space if the image data is expressed in a color space that can be treated by the rendering executing unit 121. For example, if the rendering executing unit 121 adopts a configuration capable of performing rendering according to a color value of an Lab or XYZ color space, spectral reflectance, and the like, the image data only has to be converted into a color value used when being displayed on the image display unit 151 in lighting processing (explained below), which is performed in the rendering executing unit 121, or by a post-processing unit (explained below) post-positioned in the rendering executing unit 121.

The profile storage unit 136 captures and stores the input profiles IP, the media profiles MP, the common color space profiles CP, and the like. The parameter storage unit 137 captures and stores first data FD and second data SD. The first data FD and the second data SD are parameters necessary for subjecting a printing medium, on which an image is printed, to physically-based rendering as a 3D object and displaying the printing medium. In particular, the first data FD is data relating to a form under a light source in a virtual space of the printing medium and includes 3D object information of the printing medium, camera information such as a position where the printing medium is viewed, illumination information such as a position and a hue of illumination, and background information indicating information concerning a background in which the printing medium is placed. The second data SD is data relating to image formation on the surface of the printing medium and includes data representing, for example, the texture of the surface of the printing medium. The first data FD and the second data SD are stored in the parameter storage unit 137 and used in the rendering in the rendering executing unit 121.

All what should be done is to store the first data FD and the second data SD in the parameter storage unit 137 in a nonvolatile manner about representative data having predetermined or higher frequencies of use and, select the first data FD and the second data SD according to necessity, and cause the rendering executing unit 121 to refer to the first data FD and the second data SD. Texture data in the case in which special materials such as a cloth material, a can, and a plastic sheet, which are not usually used because frequencies of use are low, are used may be stored in the external site 200 and acquired via the communication unit 141 when necessary. The first data FD such as the illumination information may be individually designated by a user in rendering but may be stored in the parameter storage unit 137 in advance about representative camera angle and light sources and used. A camera angle means a position and a direction in which a target printing medium is viewed and is equivalent to a position of a virtual visual point and a direction of a line of sight of a user viewing a virtual space. Therefore, the camera angle is assumed to be the visual point or the direction of the line of sight and is sometimes explained as "visual point" or "view".

The image display unit 151 displays, together with a background and the like, an image of a printing medium rendered by the rendering executing unit 121 and stored in the image memory 139. The image display unit 151 may be provided in the image processing apparatus 100 or may be provided to be separated from the image processing apparatus 100. Note that the image processing apparatus 100 may be implemented as a dedicated machine but may be implemented by causing a computer to execute an application program. Naturally, the computer includes a terminal such as a tablet terminal or a cellular phone. Since considerable resources and arithmetic capacity are necessary for processing of the rendering executing unit 121, only the rendering executing unit 121 may be executed by a CPU capable of performing high speed processing or a dedicated GPU, the rendering executing unit 121 may be implemented by dedicated hardware, or the image processing apparatus 100 may be configured in another site on a network.

(A2) Color Conversion Processing

Figure 2:
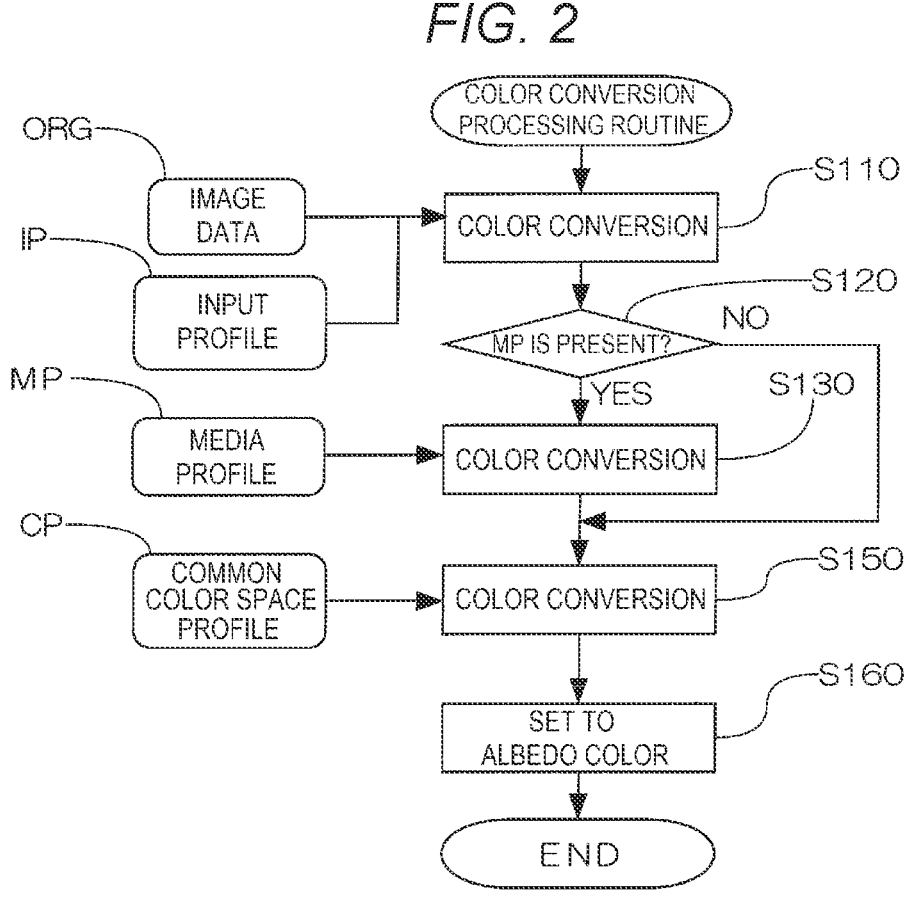
FIG. 2 is a flowchart showing an overview of color conversion processing.

Color conversion processing performed by the CMS 111 is explained with reference to FIG. 2. FIG. 2 is a flowchart showing processing for converting, with the CMS 111, original image data ORG into color data in a common color space for performing rendering processing. When the color conversion processing is started, first, the CMS 111 inputs the original image data ORG and the input profile IP and performs processing for converting the original image data ORG represented by a color system depending on equipment (for example, an RGB color system) into color data in a display system not depending on equipment (for example, an Lab or XYZ color system) (step S110). Subsequently, the CMS 111 determines whether the medial profile MP is prepared (step S120). If the media profile MP is present, the CMS 111 applies the media profile MP and performs, considering a combination of a printing apparatus (a printer) and a printing medium as a printing condition, color conversion into a range of a color that can be expressed by printing (step S130). If the media profile MP is absent, the CMS 111 does not perform the processing in step S130. Thereafter, the CMS 111 converts, using the common color space profile CP, the color data into a color value of a common color space, which is a second color space, used in rendering (step S150). In this embodiment, sRGB is used as the common color space. The CMS 111 sets the managed image data MGP obtained in this way as an albedo color, which is texture of a 3D object, (step S160) and ends this processing routine.

In step S130, if a rendering intent of color conversion of the media profile is set to absolute, a color (a base color) of the printing medium itself can be reflected. Note that, when a color value of an image set as a target of the color conversion in step S150 is outside a color gamut of the sRGB color space, the color value may be approximate to a value in the sRGB color space but may be treated to take a value outside the color gamut of sRGB. In general, RGB values of image data are stored in 8 bits for each color, that is, an integer of a value 0 to 255. However, instead of this, if a pixel value is represented as a floating-point number of a value 0.0 to 1.0, the value outside the color gamut of sRGB can be treated as a negative value or a value exceeding 1.0.

The color conversion by the CMS 111 can be performed by other configurations without being limited to the configuration shown in FIG. 2. For example, when correction data DPD for correcting deviation of a display color of the image display unit 151 for sRGB, which is the common color space, is prepared, color conversion processing using display device correction data DPD may be performed after the color conversion by the media profile MP in FIG. 2 (step S130).

Combined correction data SPD obtained by combining the display device correction data DPD and the common color space profile CP in advance may be prepared. Color conversion by the combined correction data SPD may be performed instead of the color conversion by the common color space profile CP (step S150). Note that the correction for the deviation of the display color of the image display unit 151 may be performed by a post processing unit PST after a render backend shown in FIG. 3 explained below instead of being performed by the CMS 111.

(A3) Rendering Processing

Figure 3:
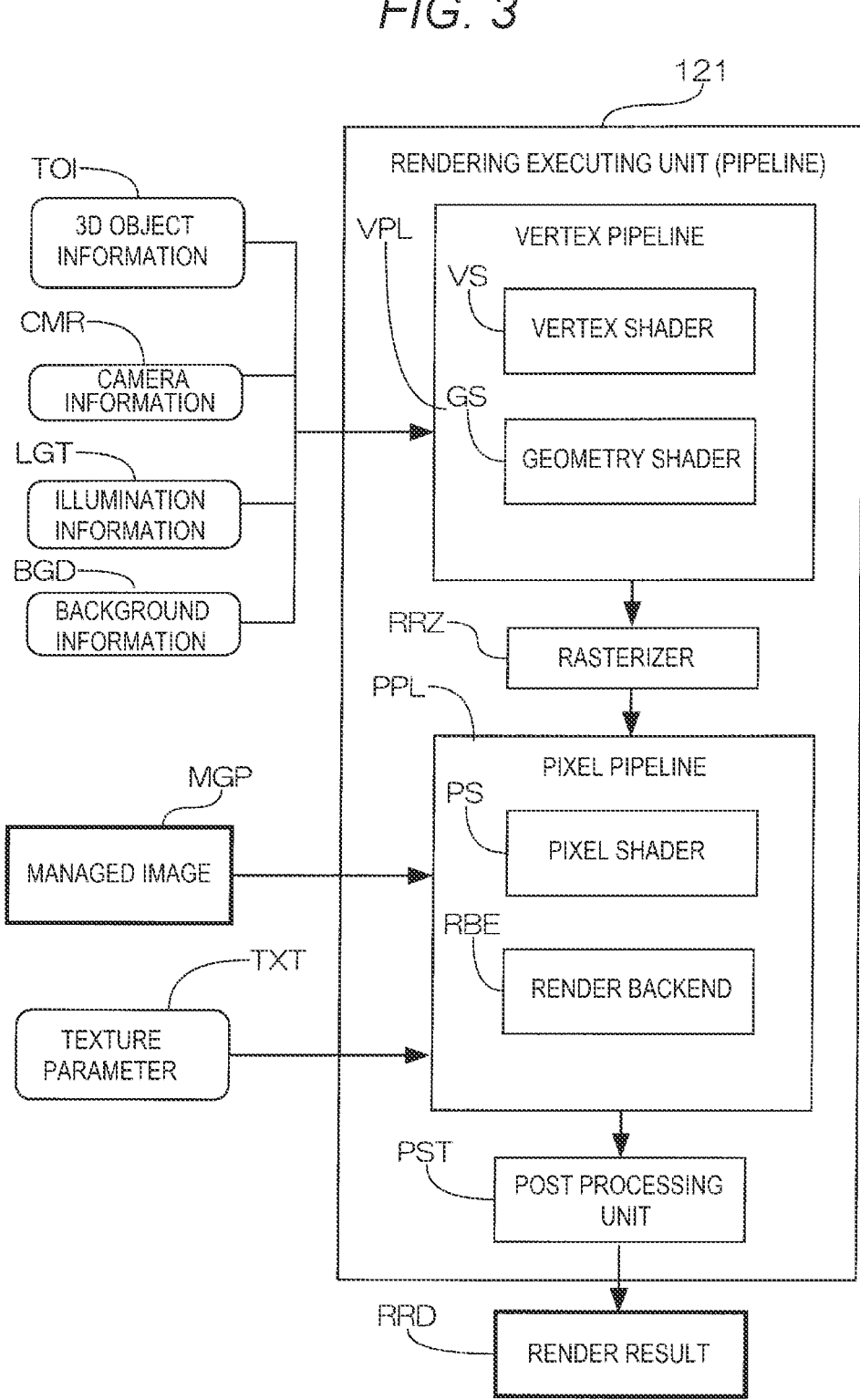
FIG. 3 is an explanatory diagram showing a logical configuration of a rendering executing unit in the embodiment.

The rendering executing unit 121 renders a printing medium, which is a 3D object, using an illumination model explained below, reflects the managed image data MGP output by the CMS 111 on the printing medium, and calculates how the printing medium on which the original image data ORG is printed is seen in a virtual space. The rendering executing unit 121 stores a result of the rendering processing in the image memory 139 and displays the result on the image display unit 151. A configuration example of the rendering executing unit 121 is shown in FIG. 3. The rendering executing unit 121 adopts a representative configuration for performing physically-based rendering processing. The rendering executing unit 121 can also adopt other configurations. The rendering executing unit 121 in this embodiment adopts a pipeline configuration including a vertex pipeline VPL and a pixel pipeline PPL and executes physically-based rendering at high speed. The vertex pipeline VPL includes a vertex shader VS and a geometry shader GS. Note that a configuration not using the geometry shader GS is also possible.

The vertex shader VS converts a coordinate on a printing medium of a vertex of the printing medium, which is a 3D object, into a coordinate of a three-dimensional space to be rendered. Comprehensively, the coordinate conversion includes coordinate conversion from a coordinate of a rendering target model (here, the printing medium) into a world coordinate, a view (camera) coordinate, and a clip coordinate. For example, the conversion into the view coordinate is performed by the geometry shader GS. Besides, the vertex shader VS performs shadow processing, calculation of a texture coordinate (UV), and the like. In these kinds of processing, the vertex shader VS and the geometry shader GS refer to object information TOI, camera information CMR, illumination information LGT, and background information BGD, and the like stored in a first storage unit 131.

The 3D object information TOI is information concerning, for example, a shape of the printing medium, which is the 3D object. Since a real printing medium is not a flat surface, the real printing medium is basically treated as a set of very small polygons. However, if the surface of the printing medium is expressed by very small polygons, the number of polygons is enormous. Therefore, it is also realistic to treat the surface of the printing medium according to texture such as a normal map or a height map. The texture such as the normal map or the height map is given as a texture parameter explained below. The camera information CMR is virtual information indicating in which position and direction a camera is installed with respect to the printing medium. The illumination information LGT includes at least one of kinds of virtual information such as a position, an angle, intensity, and a color temperature of a light source in a virtual space in which the printing medium is placed. Note that a plurality of light sources can be installed. In this case, influences of the plurality of light sources only have to be separately calculated and superimposed on the 3D object.

The background information BGD may be absent but is information concerning a background in which the printing medium, which is the 3D object, is placed in the virtual space. The background information BGD includes information concerning objects such as walls, floors, furniture, and the like disposed in the virtual space. These objects are targets of rendering like the printing medium in the rendering executing unit 121. Since illumination shines on these background objects and illuminates the printing medium, the background objects are treated as a part of the information concerning the illumination as well. By performing the rendering using such various kinds of information, it is possible to perform stereoscopic preview. Vertex information calculated by the vertex shader VS is passed to the geometry shader GS.

The geometry shader GS is used to process a set of vertexes in an object. With the geometry shader GS, it is possible to increase or reduce the number of vertexes at the time of execution and change a type of a primitive configuring the 3D object. An example of the increase or reduction of the number of vertexes is culling processing. In the culling processing, vertexes not imaged in a camera from the position and the direction of the camera are excluded from processing targets. The geometry shader GS also performs processing for generating a new primitive from an existing primitive such as a point, a line, or a triangle. A primitive having information concerning the entire primitive or an adjacent primitive is input to the geometry shader GS from the vertex shader VS. The geometry shader GS processes the input primitive and outputs a primitive to be rasterized.

The output of the vertex pipeline VPL, specifically, the primitive processed by the geometry shader GS is rasterized by a rasterizer RRZ, converted into data in pixel units, and passed to the pixel pipeline PPL. In this embodiment, the pixel pipeline PPL includes a pixel shader PS and a render backend RBE.

The pixel shader PS operates rasterized pixels and, frankly speaking, calculates a color of each of the pixels. The pixel shader PS performs, based on information input from the vertex shader VS and the geometry shader GS, processing for synthesizing texture and processing for applying a surface color. The pixel shader PS maps, on the printing medium, which is the 3D object, the managed image data MGP obtained by converting the image data ORG in the CMS 111 based on the various profiles. At this time, a lighting processing function included in the pixel shader PS performs lighting processing based on a reflection model of light of an object, the illumination information LGT explained above, and a texture parameter TXT, which is one of the second data SD stored in a second storage unit 132, and performs mapping of the managed image data MGP. The reflection model used for the lighting processing is one of arithmetic expressions of a mathematical model for simulating an illumination phenomenon in the real world. The reflection model used in this embodiment is explained in detail below.

The processing for operating pixels has a high load and takes time for processing if the number of pixels after the rasterize increases, for example, when output resolution is high. Therefore, when compared with processing in vertex units, the processing takes time and efficiency of pipeline processing is sometimes insufficient. In this embodiment, a processing program of the pixel shader PS is optimized for execution in a GPU having high parallel processing performance to realize, in a short time, an advanced effect including expression of texture.

It is further determined whether pixel information obtained by the processing of the pixel shader PS is written in the image memory 139 for display by the render backend RBE. Only when it is determined that the render backend RBE may draw data of pixels in the image memory 139, the data of the pixels is stored as data to be drawn. As a test used for the determination of drawing, there are an "alpha test", a "depth test", a "stencil test", and the like known to the public. The render backend RBE executes a set test among such tests and writes data of pixels in the image memory 139.

The pipeline processing of the rendering ends according to the processing explained above. Subsequently, processing for improving appearance is performed on the data stored in the image memory 139 by the post processing unit PST. As such processing, there is, for example, anti-aliasing processing for removing unnecessary edges of an image and making the image smooth. Besides, there is processing such as ambient occlusion, screen space reflection, and depth of field. The post processing unit PST only has to be configured to perform necessary post processing.

Figure 4:
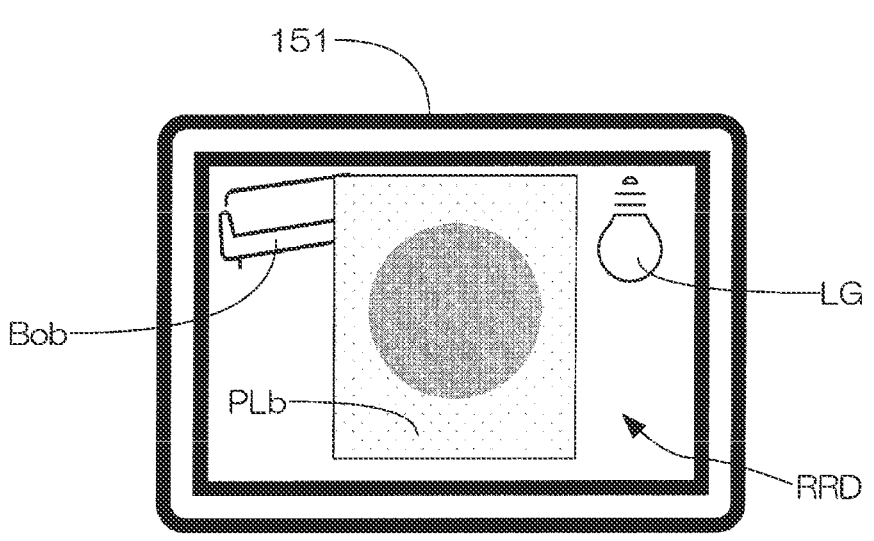
FIG. 4 is an explanatory diagram schematically showing a display example of a printing medium on which an image is printed.

The rendering executing unit 121 performs the processing explained above, whereby the rendering ends and a result of the rendering is output as a render result RRD. Actually, data written in the image memory 139 is read according to a display cycle of the image display unit 151, whereby the data is displayed as the render result RRD. An example of the render result RRD is illustrated in FIG. 4. In this example, a printing medium PLb, which is a 3D object, a light source LG, and a background object Bob such as furniture, which is present as one of backgrounds, placed in a virtual space are displayed on the image display unit 151.

Figure 5:
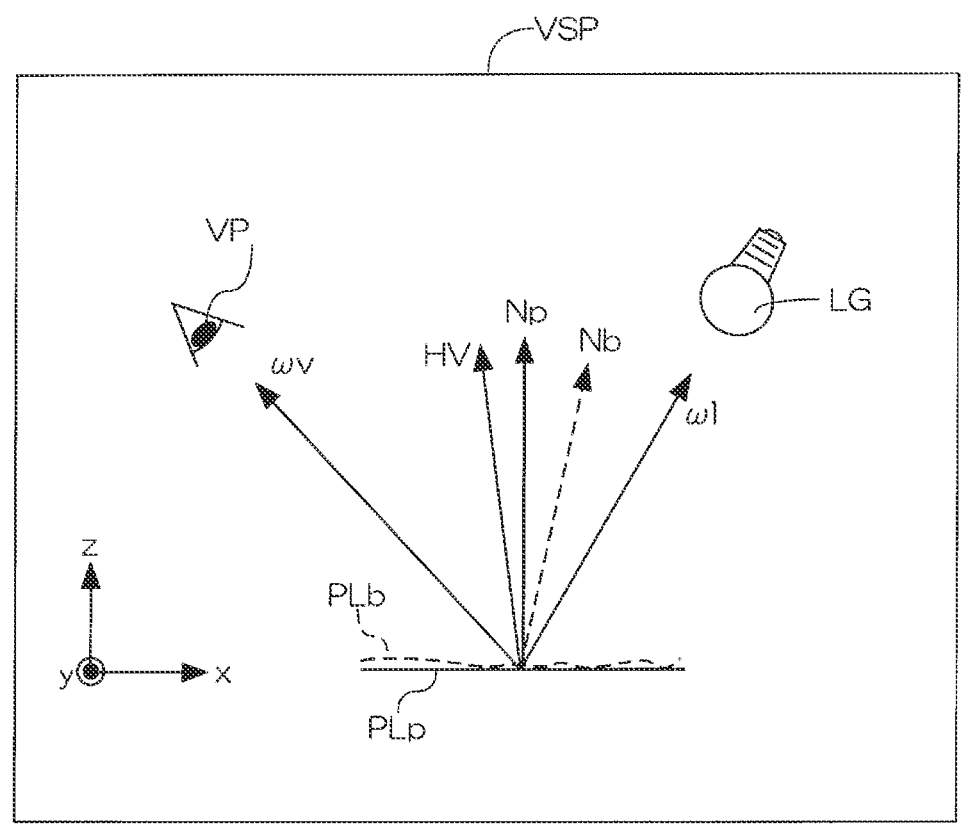

A relation among the printing medium PLb, the light source LG, and a visual point (a camera) VP placed in the virtual space is illustrated in FIG. 5. The relation among the light source LG, the visual point VP, and the printing medium PLb is three-dimensional in a virtual space VSP. However, in FIG. 4, the virtual space VSP is shown as an x-z plane: x is a coordinate of a point where vectors explained below gather. A positional relation between the light source LG that illuminates the printing medium PLb, which is a rendering target, and the visual point VP is illustrated with respect to a predetermined coordinate x of the printing medium PLb. In FIG. 4, a light source direction vector ωl from the coordinate x toward the light source LG, a visual point direction vector ωv from the coordinate x to the visual point VP, and a half vector HV of the light source direction vector ωl and the visual point direction vector ωv are shown. A reference sign Np indicates a normal vector in the case in which the printing medium PLb is assumed to be a perfect plane PLb. A reference sign Nb indicates a normal vector in a coordinate x of the actual printing medium PLb, which is not a perfect plane. Note that, in FIG. 4, assuming that the visual point VP (the camera) is present substantially in the front of the printing medium PLb, a rendering result of the printing medium PLb is illustrated.

In the image processing apparatus 100 in this embodiment, a position and an angle of a printing medium in the virtual space can be freely changed to check appearance of the printing medium together with an image on the printing medium. When the user operates a not-shown pointing device on an image displayed on the image display unit 151, the image processing apparatus 100 repeats a series of processing for performing the rendering processing by the rendering executing unit 121 again and displaying a result of the processing on the image display unit 151. The pointing device may be a 3D mouse, a tracking ball, or the like or may be a pointing device of a type for operating, with a finger or a touch pen, a multi-touch panel provided on the image display unit 151. For example, when the multi-touch panel is provided on the surface of the image display unit 151, the printing medium PLb, the light source LG, and the like may be directly moved by a finger or the like or the printing medium PLb may be rotated or the distance between the light source LG and the printing medium PLb may be three-dimensionally changed using two fingers.

Figure 6:
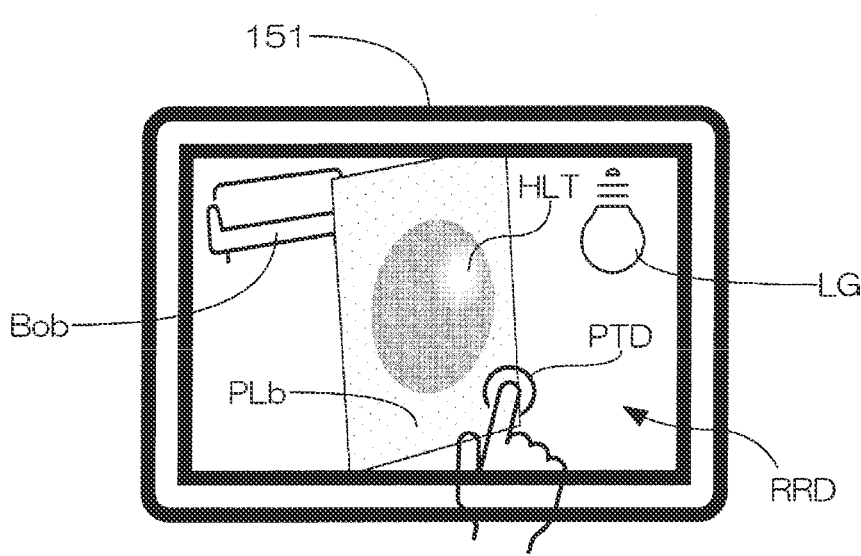
FIG. 6 is an explanatory diagram schematically showing a state in which display of a printing medium changes according to a change in an angle of the surface of the printing medium, on which an image is formed, with respect to the light source.

When the positions, the angles, and the like of the printing medium PLb and the light source LG in the virtual space are changed, the rendering executing unit 121 performs the rendering processing every time and displays the render result RRD of the rendering processing on the image display unit 151. An example of such display is shown in FIG. 6. As shown in FIG. 6, when the positions, the angles, and the like of the printing medium PLb and the light source LG in the virtual space are changed, a printing medium on which an image is printed is subjected to the physically-based rendering every time and is displayed in a form close to a state in which an actual printing medium on which the image is printed is seen in the real space.

An overview of the display of the printing medium on which the image data ORG is printed is explained above. In the image processing apparatus 100 in this embodiment, when the CMS 111 subjects the image data ORG to color conversion, the CMS 111 can perform simple color conversion by the input profile IP without performing color conversion using an image, which is obtained by rendering a result of color conversion using the printing profile MP, and the printing profile MP, compare a result of the color conversion with a rendered image, and perform color matching considering the printing profile MP.

(A4) Display Processing for Image Comparison

Figure 7:
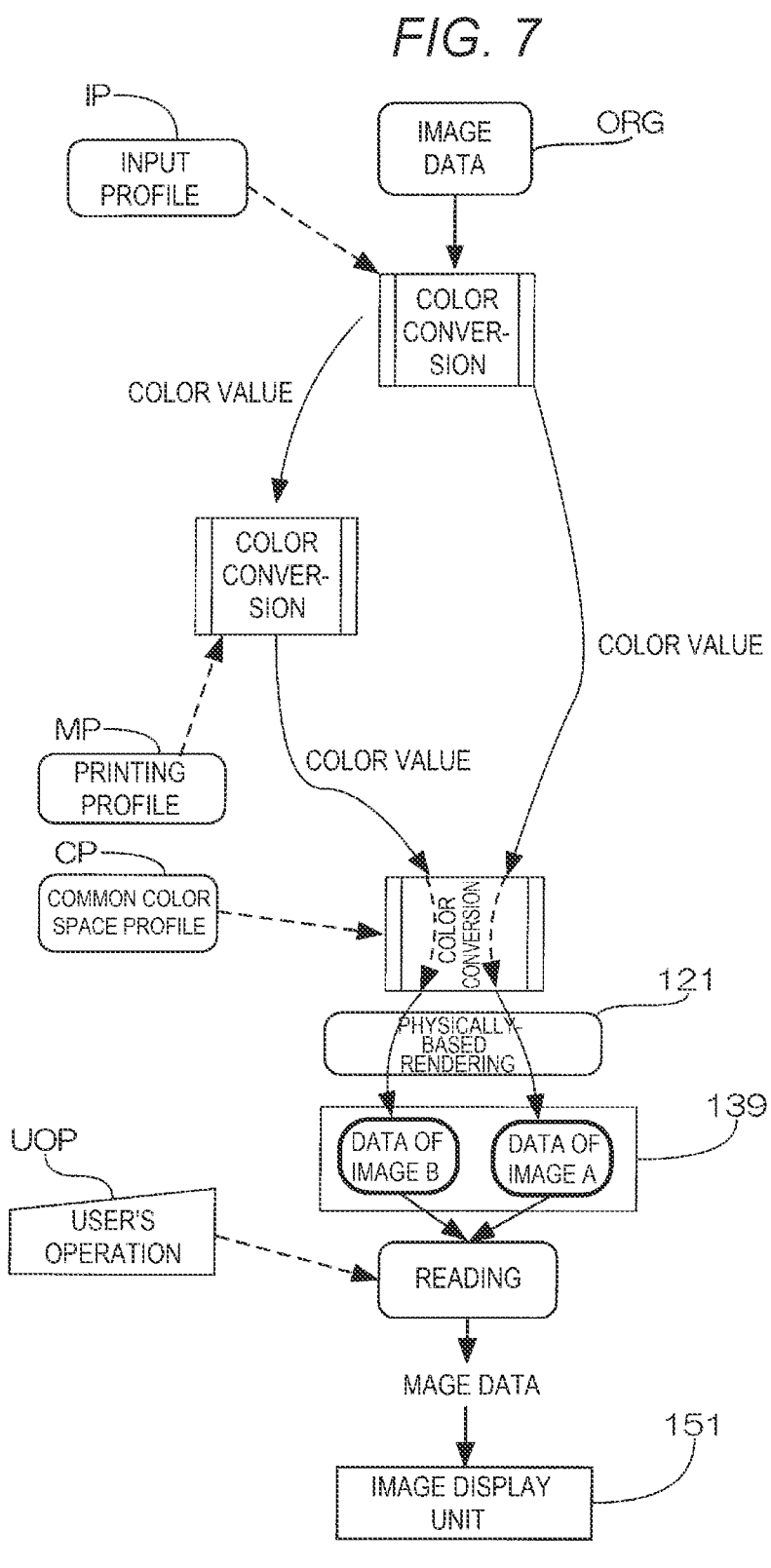
FIG. 7 is an explanatory diagram for explaining flows of data in the case in which a printing profile is used and the case in which the printing profile is not used.

An overview of processing for performing such image comparison is shown in FIG. 7. As shown in FIG. 7, the image data ORG is converted into a device-independent color value using the input profile IP. The color value is converted using the printing profile MP and an obtained color value is subjected to color conversion using the common color space profile CP. Similarly, image data not subjected to the color conversion using the printing profile MP is also subjected to color conversion using the common color space profile CP and subjected to the rendering processing by the rendering executing unit 121. An image of a render result of the rendering processing is stored in the image memory 139. In this embodiment, in the pixel pipeline PPL in the rendering executing unit 121, since only one pixel shader PS is provided, the rendering processing is sequentially performed for image data of routes and a result of the rendering processing is stored in the image memory 139. Order of the rendering processing may be any order. However, since the color conversion not using the printing profile MP ends earlier, the rendering processing for the image data not subjected to the color conversion using the printing profile MP is preferably performed first. The image data subjected to the rendering processing is shown as image data A and image data B in FIG. 7.

It is set by the user's operation UOP which of an image A and an image B corresponding to the image data A or the image data B stored in the image memory 139 is actually displayed on the image display unit 151. One or both of the image data A and B are read and displayed on the image display unit 151 according to setting by the user's operation UOP.

Figure 8:
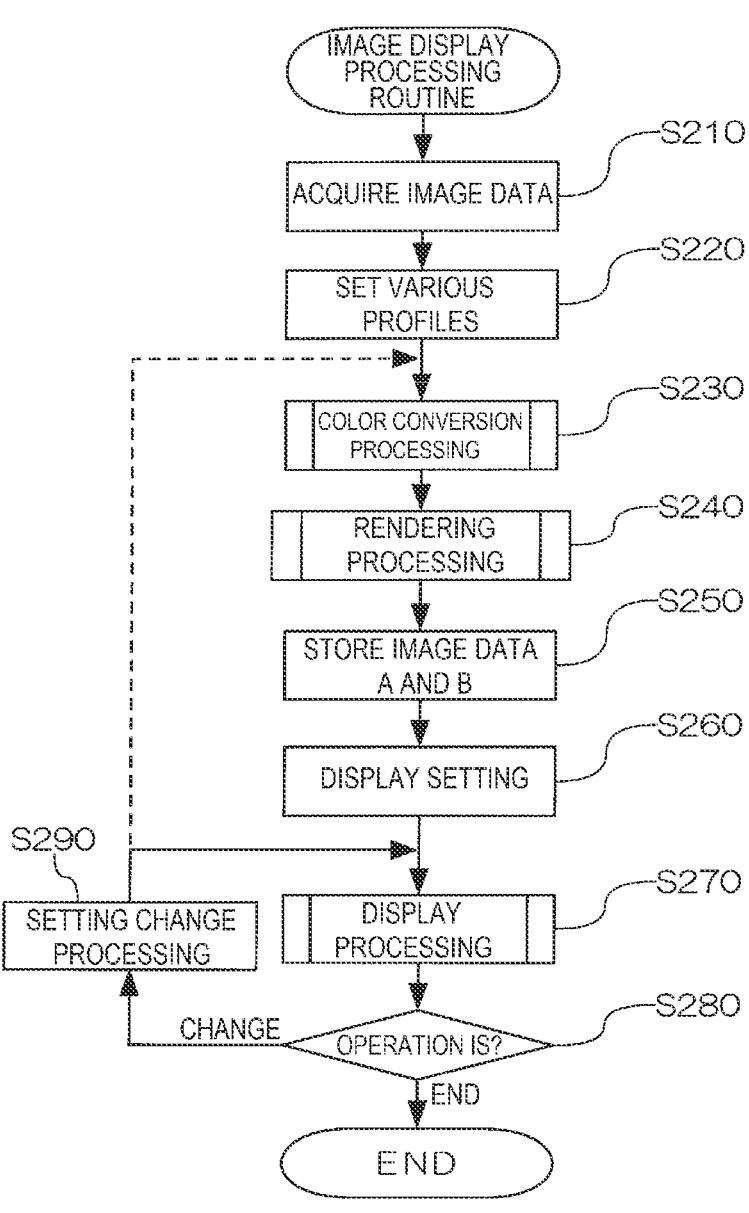
FIG. 8 is a flowchart showing an image display processing routine.

An image display processing routine executed in the image processing apparatus 100 in order to implement the processing shown in FIG. 7 is explained with reference to a flowchart of FIG. 8. This processing is started when the user attempts to compare how an image to be printed on a desired printing medium is seen. When the processing shown in FIG. 8 is started, first, the image processing apparatus 100 performs processing for acquiring the image data ORG to be printed (step S210). The image data ORG can be acquired by various methods as explained above.

Subsequently, the image processing apparatus 100 acquires, from the profile storage unit 136, various profiles such as the input profile IP corresponding to the acquired image data ORG (step S220) and performs color conversion processing (step S230). The color conversion processing is, as shown in FIG. 7, the color conversion to which the printing profile MP is not applied and the color conversion to which the printing profile MP is applied. The common color space profile CP is applied to both the color conversions.

Thereafter, the image processing apparatus 100 performs rendering processing (step S240). The image processing apparatus 100 sequentially performs the rendering processing for two image data subjected to the color conversion in step S230 and stores the image data A and B obtained as a result of the rendering processing in the image memory 139 (step S250). After storing the image data A to which the printing profile MP is not applied and the image data B to which the printing profile MP is applied, the image processing apparatus 100 performs display setting (step S260). The display setting is setting for setting a method of displaying the image data A and B and is performed by the user's operation UOP. Thereafter, the image processing apparatus 100 performs display processing for an image conforming to the user's operation UOP (step S270).

An example of the display in step S270 is shown in FIG. 9. In this example, the image A subjected to the color conversion and the rendering processing without the printing profiles MP applied thereto and the image B subjected to the color conversion and the rendering processing with the printing profiles MP applied thereto are displayed side by side. Besides, a change button 30 for instructing to change the display and an end button 20 for instructing to end the display are displayed on the image display unit 151.

After the image is displayed, the image processing apparatus 100 discriminates operation of the user (step S280) and, when determining that the change button 30 is clicked, performs display setting change processing (step S290). At this time, as shown in FIG. 9, a dialog box DLG for performing change processing is displayed. The user can change the printing profile MP used for color conversion. In the example shown in FIG. 9, when selecting setting for not using a printing profile or applying the printing profile MP, the user can select any one printing profile out of printing profiles 1 to n (n is an integer equal to or larger than two).

When the setting concerning the printing profile MP is changed and the completion button 25 displayed in the dialog box DLG is operated, the image processing apparatus 100 returns to step S270 or step S230 explained above and performs the processing according to content of the setting change. When the image A or B subjected to the color conversion in advance only has to be displayed, as indicated by a solid line in FIG. 8, the image processing apparatus 100 only have to perform the processing in step S270 after the display setting change processing in step S290. This is because the images A and B that should be displayed have already been converted and rendered. On the other hand, when a new printing profile is designated by operation of the change button, as indicated by a broken line shown in FIG. 8, the image processing apparatus 100 returns to the color conversion in step S230 and performs the color conversion processing and the subsequent processing. As a result, as shown in FIG. 9, when a new printing profile is set, the image processing apparatus 100 applies the changed printing profile MP and performs the color conversion and the rendering processing. As a result, an obtained image is displayed. When the end button 20 displayed on the image display unit 151 is operated, the image processing apparatus 100 proceeds to "END" and ends this image display processing routine.

When the image display processing by the image processing apparatus 100 explained above is performed, the user can observe, side by side, the image B subjected to the color conversion and the rendering processing with the printing profile MP applied thereto and the image A to which the printing profile MP is not applied. Therefore, the user can easily understand how a printing medium on which an image is printed by applying the printing profile MP is seen. Since the user can compare the image with appearance of an image on the printing medium to which the printing profile MP is not applied, the user can understand the significance of the printing profile MP. Moreover, in this example, the user can easily change the printing profile MP and attempt a change of appearance on the printing medium. As a result, when the user finally prints the image data ORG, even if the user does not perform trial printing, the user can easily grasp a printing result obtained when a printing profile is applied and a printing result obtained when the printing profile is not applied. The user can reduce a time until a desired print is obtained and can suppress waste of prints.

Figure 10:
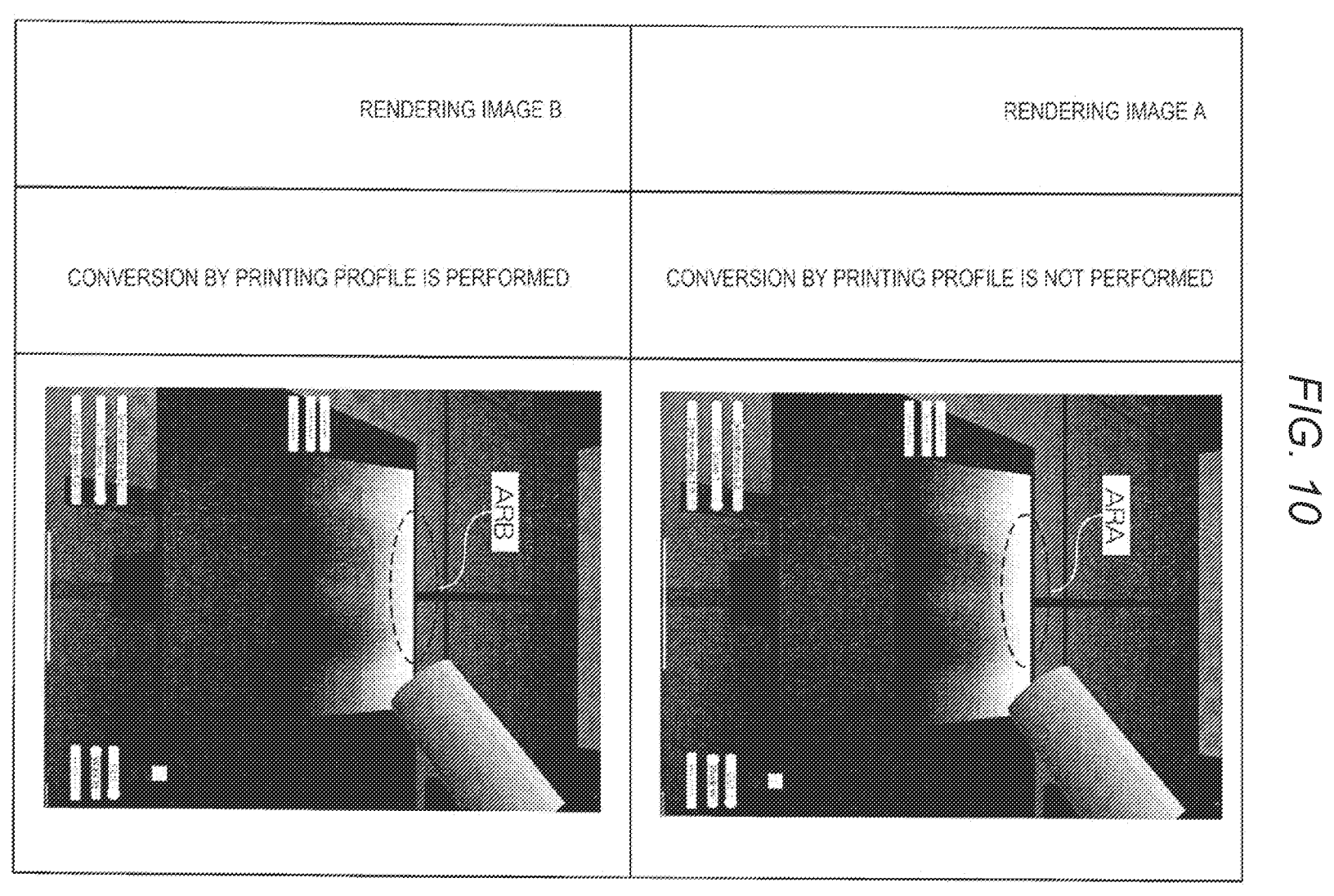

Actual rendering images A and B are shown in FIG. 10. The rendering image A is an image subjected to the color conversion and the rendering processing without the printing profile MP applied thereto. The rendering image B is an image subjected to the color conversion and the rendering processing with a predetermined printing profile MP applied thereto. It is seen that the rendering image B has a slightly darkened color as a whole. This is because all colors included in the image data ORG of an original image determined by the input profile IP cannot be reproduced by the printing profile MP including predetermined printing conditions. A region ARA surrounded by a broken line at the top indicates a blank portion. In a region ARB of the image to which the printing profile MP is applied, the brightness of a blank portion is low and a yellowish color of paper is expressed. Since an intent is set to "Absolute" in the printing profile MP used in the color conversion, the influence of a tint (here, the yellowish color) of the paper itself appears.

In the example explained above, the printing profile MP is directly designated and is referred to in the color conversion. However, as explained above, a printing condition affecting a color of an image is a combination of a printing apparatus and a printing medium. The printing profile MP is decided according to the printing apparatus and the printing medium. Therefore, the printing profile MP may be indirectly set according to the printing apparatus and the printing medium. An example of the setting is shown in FIG. 11.

Figure 11:
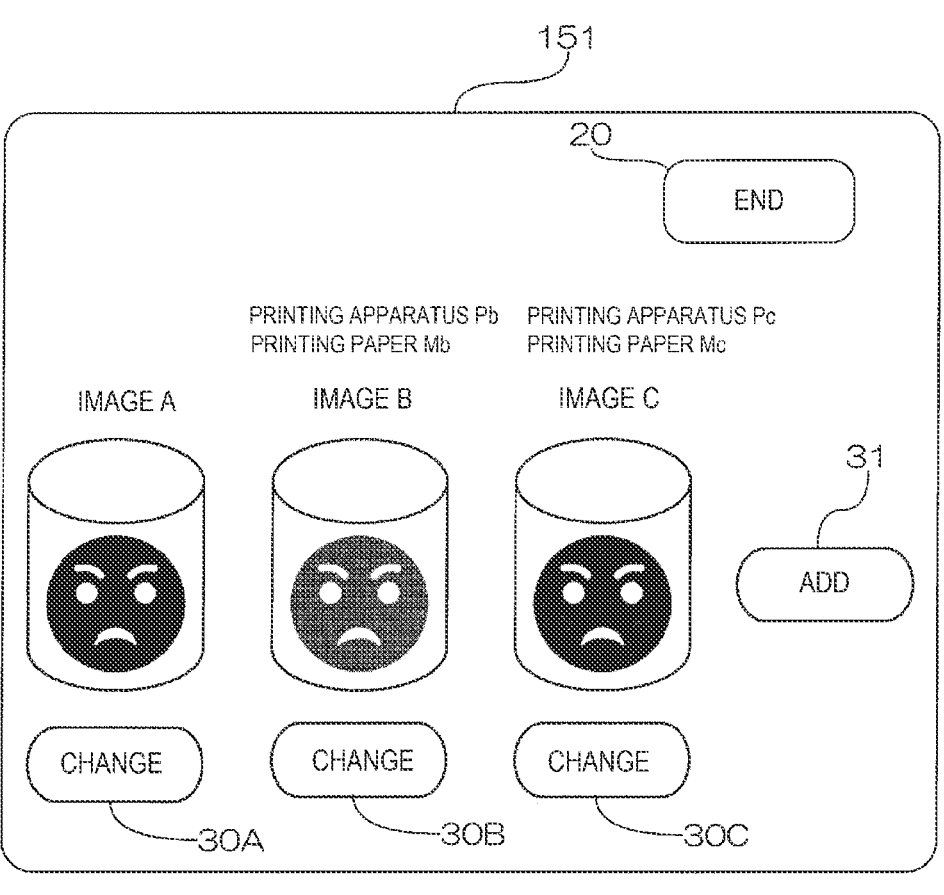
FIG. 11 is an explanatory diagram showing another example of display for comparing processing results.

In FIG. 11, three images, that is, an image A, an image B, and an image C are displayed. Change buttons 30A, 30B, and 30C for changing printing profiles of the images A, B, and C and changing the images A, B, and C are displayed under the images A, B, and C. The end button 20 is displayed at the upper right of a screen of the image display unit 151 and an addition button 31 for adding an image is displayed at the right end of the screen. Among the displayed three images, as in FIG. 9, the image A is an image subjected to the color conversion and the rendering processing without any of the printing profiles applied thereto. The image B is an image subjected to the color conversion and the rendering processing with a printing profile bb applied thereto when print paper Mb is used in a printing apparatus Pb. The image C is an image subjected to the color conversion and the rendering processing with a printing profile cc applied thereto when print paper Mc is used in a printing apparatus Pc.

In this example, the three images in total are displayed and not only comparison of a case in which a printing profile is not applied and a case in which the printing profile is applied but also comparison of cases in which different printing profiles are applied can be easily performed. When the change buttons 30A, 30B, and 30C or the addition button 31 is pressed, a dialog box DLGS shown in FIG. 12 is displayed and a printing profile to be applied anew can be selected. Therefore, it is also easy to correct an existing image and add a new image.

In the example shown in FIG. 12, printing apparatuses Pb, Pc, and Pd and other Pe are shown as types of printing apparatuses, media Mb, Mc, and Md are shown as types of media (printing media), and printing profiles obtained by combining the printing apparatuses and the media can be selected. In the dialog box DLGS, painted circles (black circles) indicate already selected printing profiles. In the example shown in FIG. 12, the printing profile bb in the case in which a printing apparatus is Pb and a printing medium is the medium Mb is applied to the image B and the printing profile cc in the case in which a printing apparatus is Pc and a printing medium is the medium Mc is applied to the image C.

It is also possible that a combination of a printing apparatus and a printing medium is absent. For example, in the printing apparatus Pb that uses only water-based ink, printing cannot be performed in a combination with a medium (for example, a plastic sheet) Md for oil-based ink. Therefore, a printing profile corresponding to the combination is absent and "N/A" is described in FIG. 12. Here, a printing apparatus that uses oil-based ink is assumed as the other printing apparatus Pe and a printing profile cannot be prepared in advance. Therefore, a printing profile can be selected only for the medium Md and only when details of the printing profile are manually set. A printing profile in the case in which a combination of the other printing apparatus Pe and the medium Md, which is the plastic sheet, is selected can be set by a method of causing the other printing apparatus Pe to print a predetermined color chart on the medium Md and the user measuring spectral reflectance of a printed image.

When any one of the change buttons 30A, 30B, and 30C is clicked in a state in which the images A, B, and C are displayed as shown in FIG. 11, a setting screen shown in FIG. 12 is displayed on the image display unit 151. When the user selects a selectable combination of a printing apparatus type and a printing medium type, the image processing apparatus 100 performs processing for changing a printing profile (step S290) and performs the processing again from the color conversion processing (step S230). As a result, an image of the clicked change button is changed to a color-converted image using a printing profile corresponding to the selected combination of the printing apparatus type and the printing medium type. Therefore, when various types of printing apparatuses and printing media are combined, it is possible to easily switch how an image to be printed is seen and check the image in a state in which the physically-based rendering is performed in a virtual space. Therefore, even if the user does not perform trial printing or the like, the user can visually check how a desired image is printed and how the image is seen in an assumed type of a printing apparatus and an assumed type of a printing medium and can suppress waste of resources and man-hours.

Figure 13:
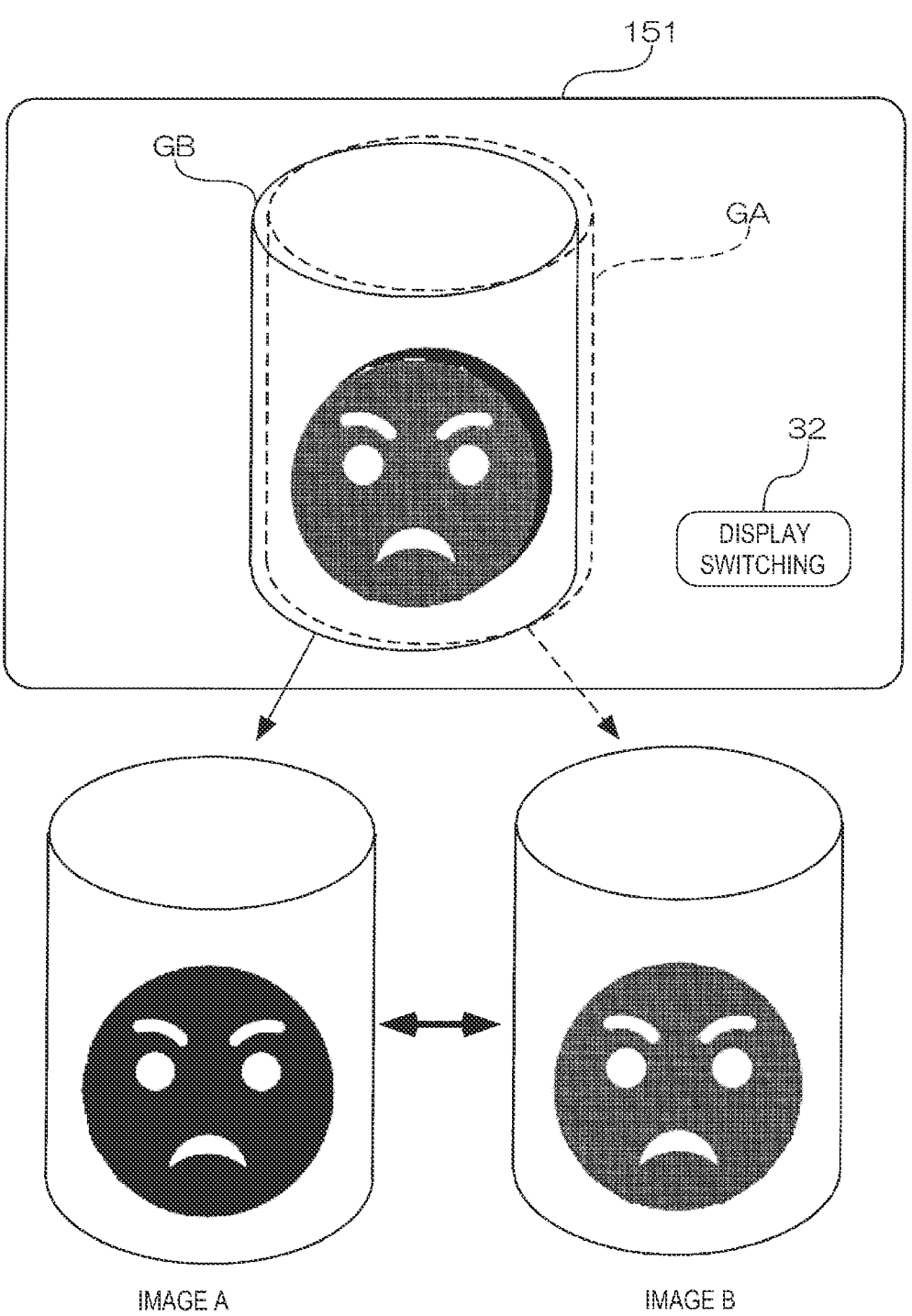
FIG. 13 is an explanatory diagram showing another example of display for comparing processing results.

As appearance of an image in the case in which a printing profile is changed, as shown in FIGS. 9 and 11, the case in which a printing profile is not used and the case in which the printing profile is used may be juxtaposed or the cases in which different printing profiles are applied may be juxtaposed. However, as illustrated in FIG. 13, the image may be displayed in a form in which the image is switched in the same place. In this example, a display switching button 32 is displayed on the image display unit 151. Every time the display switching button 32 is operated, the image A in the case in which the printing profile is not used and the image B in the case in which the printing profile is used are alternately switched and displayed in a position GA and a position GB. In FIG. 13, for convenience of understanding, the position GB is indicated by a broken line and is drawn to be slightly deviated from the position GA. However, actually, the positions GA and GB of the images A and B are the same. As shown in a lower part of FIG. 13, the images A and B are alternately displayed. A difference between the images A and B can also be easily grasped in this way.

Figure 14:
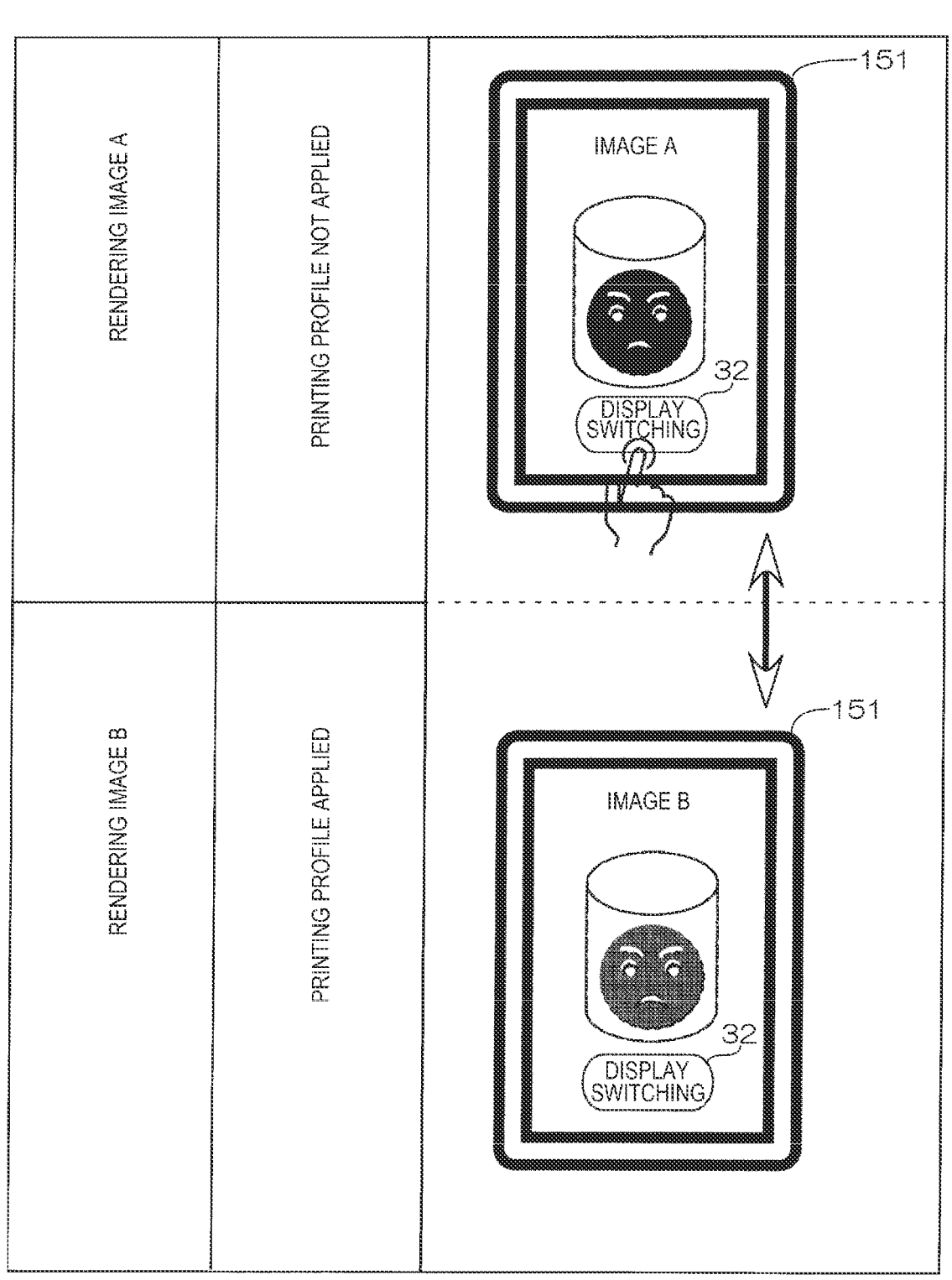
FIG. 14 is an explanatory diagram showing a state of switching of display.

An example of such switching display is shown in FIG. 14. In this example, first, the rendering image A to which a printing profile is not applied is displayed on the image display unit 151 as shown in an upper part of FIG. 14. When the user operates the display switching button 32 in this state, the rendering image B to which the printing profile is applied is displayed as shown in a lower part of FIG. 14. Note that all what should be done is to, when the printing profile to be applied is changed, display a change button when the image B to which a preset printing profile is applied is displayed and, when the change button is operated, display the setting screen shown in FIG. 12. Naturally, a screen for selecting a file for directly designating a printing profile may be displayed and the user may directly select the printing profile.

B. Second Embodiment

Subsequently, the image processing apparatus 100 in a second embodiment is explained. The image processing apparatus 100 in the second embodiment includes the same hardware configuration as the hardware configuration in the first embodiment. Overviews of color conversion processing and rendering processing are the same as the overviews in the first embodiment. However, the second embodiment is different from the first embodiment in that a color of an image to be printed on a printing medium is converted into a color of an image to be actually printed by a color management system (CMS) and, in lighting processing in rendering, a printing medium on which an image is printed is treated as a 3D object and, in addition, the texture of the surface of the printing medium is considered using the texture parameter TXT of the surface of the printing medium. Therefore, reproducibility of the printing medium displayed on the image display unit 151 is high.

In the following explanation, this point is explained as the following:

[1] a printing medium on which an image is printed is treated as a 3D object, and

[2] the texture of the surface of the printing medium is considered using the texture parameter TXT.

About [1]

How the 3D object is seen in a virtual space can be represented using a bidirectional reflectance distribution function (BRDF) and luminance of reflected light in parts of an object. The bidirectional reflectance distribution function BRDF indicates an angle distribution characteristic of the reflected light at the time when light is made incident from a certain specific angle. The luminance is brightness of the object. Both of the bidirectional reflectance distribution function BRDF and the luminance are collectively referred to as illumination model as well. An example of a reflection model adopted in this embodiment is described below. The BRDF can be represented as a function $f(x, \omega l, \omega v)$ and the luminance can be represented as a function $L(x, \omega v)$ using the following Expressions (1) and (2).

$$f(x, \omega l, \omega v)=kD/\pi+kS*(F*D*V) \tag{1}$$

$$L(x, \omega v)=f(x, \omega l, \omega v)*E\perp(x)*n\cdot\omega l \tag{2}$$

where, x represents an in-plane coordinate, $\omega v$ represents a visual point direction vector, $\omega l$ represents a light source direction vector, kD represents diffused reflective power (Diffuse Albedo), kS represents specular reflection power (Specular Albedo), F represents a Fresnel term, D represents a normal distribution function, V represents a geometrical damping term, $E\perp(x)$ represents illuminance perpendicularly made incident on a coordinate x, and n represents a normal vector.

A first term $kD/\pi$ of the BRDF is a diffuse reflection component and is a lambert model. A second term is a specular reflection component and is a Cook-Torrance model. In Expression (1), in some case, $kd/\pi$ is referred to as diffuse reflection term and $kS*(F*D*V)$ is referred to as specular reflection term. About the Fresnel term F, the normal distribution function D, and the geometrical damping term V, since models and calculation methods are publicly known, explanation thereof is omitted. As the BRDF, a function corresponding to a reflection characteristic of a 3D object surface and a purpose of rendering only has to be used. For example, Disney Principled BRDF may be used. Note that, in this embodiment, the BRDF is used as a function representing light reflection. A bidirectional scattering surface reflectance distribution function (BSSRDF) may be used as the function representing light reflection.

As it is seen from Expressions (1) and (2) described above, the normal vector n, the light source direction vector $\omega l$, and the visual point direction vector $\omega v$ are necessary for the calculation of the reflection model. As a rendering processing target, the printing medium is treated as a 3D object configured by a plurality of very small polygons. However, the normal vector n reflecting very small unevenness on the printing medium surface is calculated from a normal Np of the polygons and a normal map explained below. Therefore, in the vertex pipeline VPL, the normal Np of the polygons and a UV coordinate for determining a reference position of the normal map are calculated and input to the pixel pipeline PPL together with the light source direction vector $\omega l$ and the visual point direction vector $\omega v$. In the pixel pipeline PPL, the pixel shader PS refers to the normal map given as one of texture parameters using the UV coordinate and calculates the normal vector n from a value of the normal map referred to and the normal Np of the polygons.

In this embodiment, as explained above, the printing medium on which the image is printed is treated as the 3D object and the physically-based rendering is performed according to Expressions (1) and (2) described above. Note that, when a user changes the positions, the angles, and the like of the printing medium PLb and the light source LG in the virtual space using the pointing device as shown in FIG.

6, the light source direction vector $\omega l$ and the visual point direction vector $\omega v$ are calculated every time the user changes the positions, the angles, and the like.

About [2]

In this embodiment, the texture of the surface of the printing medium is considered using the texture parameter TXT. Parameters described below are possible as the texture parameters TXT. However, it is unnecessary to consider all of the parameters. At least one of the parameters described below, for example, smoothness only has to be considered.

Smoothness S or Roughness R

Smoothness S or roughness R is a parameter indicating smoothness of the surface of the 3D object. In general, the smoothness S is designated in a range of a value 0.0 to 1.0. The smoothness S affects the normal distribution function D and the geometrical damping term V of Expression (1) BRDF described above. When a value of the smoothness S is large, specular reflection intensifies and glossy feeling is presented. The roughness R may be used instead of the smoothness S. The smoothness S and the roughness R can be converted as $S=1.0–R$. Note that, in some case, smoothness is referred to as smoothness degree and roughness is referred to as roughness degree.

Metallicity M (Metallic)

Metallicity M indicates a degree of the surface of the 3D object being metallic. A value of the metallicity M is large when the metallicity of the surface is high. When the metallicity M is large, the object surface easily reflects light from the periphery, the reflection reflects a scene in the periphery, and a color of the object itself is easily hidden. The metallicity M affects the Fresnel term F.

The Fresnel term F can be represented as the following Expression (3) if Schlick approximation is used.

$$F(\omega l, h)=F_0+(1–F_0)(1–\omega l\cdot h)^5 \tag{3}$$

Here, h represents a half vector of the visual point direction vector $\omega v$ and the light source direction vector $\omega l$ and $F_0$ represents specular reflectance at the time of vertical incidence. The specular reflectance $F_0$ only has to be directly designated as a color of specular reflection light (specularColor) or given by Expression (4) of linear interpolation (here, represented as a lerp function) using the metallicity M.

$$F_0=lerp(0.04, tC, M) \tag{4}$$

Here, tC represents a color of texture (albedoColor) of the 3D object. Note that a value 0.04 in Expression (4) representatively indicates a value of each of RGB indicating a general value in nonmetal. The same applies to the color tC of the texture.

Normal Map

In a normal map, a normal vector of a very small uneven surface on the surface of the printing medium is represented. By associating (pasting) the normal map with the 3D object, the normal vector of the very small uneven surface on the surface of the printing medium can be given to the 3D object. The normal map can affect the Fresnel term F, the normal distribution function D, and the geometrical damping term V of the BRDF.

Other Texture Parameters

As parameters that can function as the texture parameters, besides, there are a specular reflection color (specularColor), a clear coat layer parameter indicating presence or absence of a clear coat layer on the printing medium surface, thickness of the clear coat layer, transparency, or the like of the clear coat layer, and the like.

As explained above,

[1] a printing medium on which an image is printed is treated as a 3D object, and

[2] the texture of the surface of the printing medium is considered using the texture parameter TXT, whereby, in the image processing apparatus 100 in this embodiment, appearance of the printing medium on which the image is printed is displayed on the image display unit 151 at a high degree of freedom and high reproducibility. In this case, when the texture parameter is changed, the appearance of the image changes. For example, when the printing medium is viewed from a direction right opposed to the printing medium as illustrated in FIG. 4, rough feeling caused from the texture of the printing medium surface and fine unevenness on the surface of the printing medium appears. When the printing medium is rotated and viewed from an oblique direction as illustrated in FIG. 6, illumination by the light source LG is projected on the surface of the printing medium and a highlight section HLT caused as a result of the reflection appears. The illumination light does not need to be limited to light by illumination directly directed to the printing medium like a spotlight and includes the sunlight, indirection illumination, and indirect light. As explained above, a change in a viewing direction or the like affects the appearance of the printing medium on which the image is printed. Therefore, in the second embodiment, not only switching of a printing profile but also switching of a texture parameter and display relating to the switching are performed. An overview of this processing is shown in a flowchart of FIG. 15.

Figure 15:
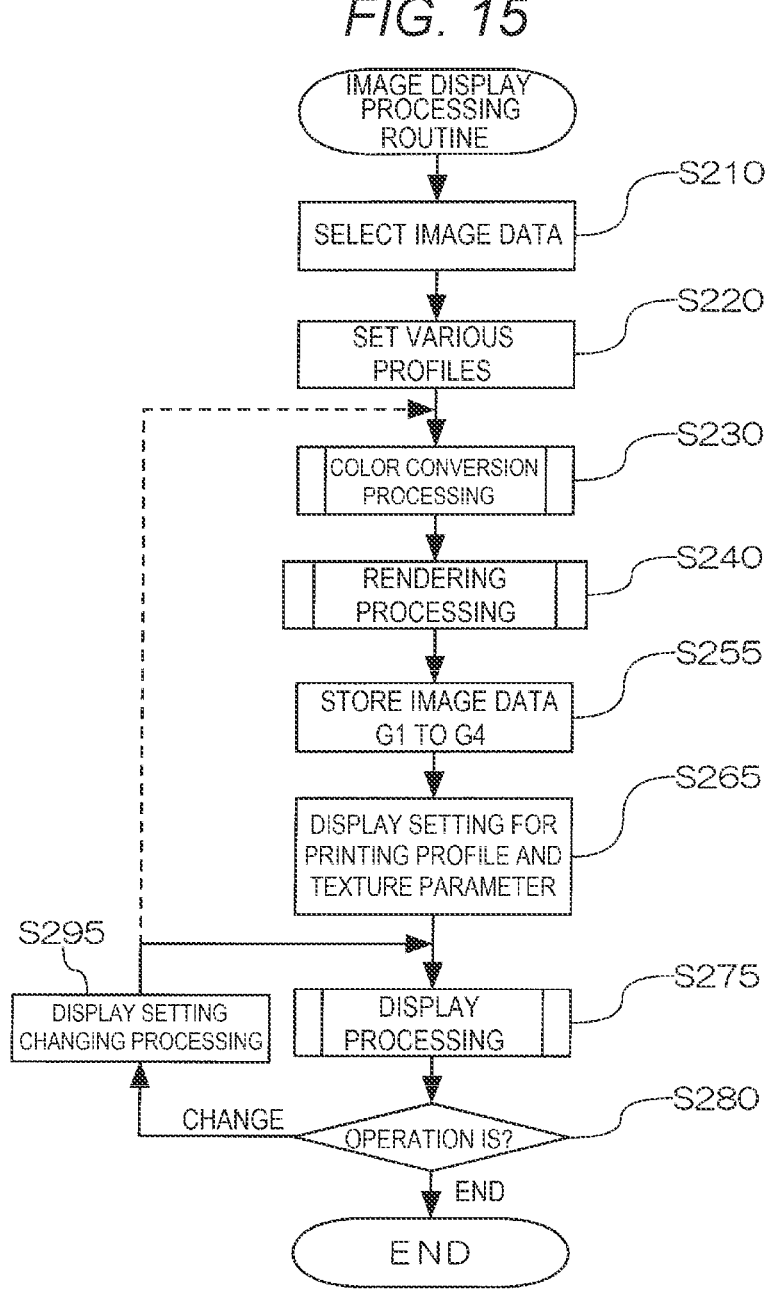
FIG. 15 is a flowchart showing an image display processing routine in the case in which setting of printing profiles and texture parameters are performed in a second embodiment.

Processing shown as an image display processing routine in FIG. 15 is substantially the same as the processing in the first embodiment. The processing is different in that, whereas the processing in steps S250, S260, S270, and S290 in the first embodiment is the change of the printing profile and the image display as a result of the change, a change in a printing profile and a texture parameter and image display as a result of the change are performed in steps S255, S265, S275, and S295 in the second embodiment corresponding to the steps S250, S260, S270, and S290. Details of these kinds of processing are shown in a flowchart of FIG. 16.

As shown in FIG. 16, in step S255, four kinds of images G1 to G4 are stored instead of the images A and B, stored in step S260, different in presence or absence of application of a printing profile and a type of the printing profile to be applied. The images G1 to G4 are, as shown as a table TBL in FIG. 16, images in the case in which ON/OFF of application of the printing profile MP and ON/OFF of application of the texture parameter TXT are combined. Specifically, the image G1 is an image obtained when both of the printing profile MP and the texture parameter TXT are applied. Since the image G1 is closest to an actual printing result, the image G1 is referred to as a real view herein. The image G2 is an image obtained when the printing profile MP is not applied and the texture parameter TXT is applied and is an image reflecting only texture. The image G3 is an image obtained when the printing profile MP is applied and the texture parameter TXT is not applied and is an image in which a color of an actual image is reproduced by the printing profile. The image G4 is an image obtained when both of the printing profile MP and the texture parameter TXT are not applied and is an original image in which differences in a printing apparatus and a printing medium, the texture of the surface of the printing medium, and the like are not considered.

If a printing profile and a texture parameter are set by the user, the image processing apparatus 100 combines ON/OFF of the printing profile and the texture parameter, performs the color conversion processing (step S230) and the physically-based rendering (step S240), and stores the four kinds of images G1 to G4, ON/OFF of which are combined, in the image memory 139. Subsequently, the image processing apparatus 100 receives display setting by the user (step S265). In this processing, the image processing apparatus 100 displays, on the image display unit 151, a dialog box for display setting corresponding to the table TBL shown in FIG. 16. The user selects a combination of ON/OFF of the printing profile MP and the texture parameter TXT to perform the display setting.

In response to the display setting, the image processing apparatus 100 performs processing for displaying any one of the images G1 to G4 on the image display unit 151 (step S275). Specifically, the image processing apparatus 100 displays any one of the images G1 to G4 according to a combination of ON/OFF of the printing profile MP and ON/OFF of the texture parameter TXT. This display may be display for displaying the original image (the image A) in which both of the printing profile MP and the texture parameter TXT are off and the real view (the image B) in which both of the printing profile MP and the texture parameter TXT are on as in the display shown in FIG. 9 or may be display for displaying three or more images, for example, the images G1, G2, and G4 as in the display shown in FIG. 11. At this time, as in FIG. 9 and FIG. 11, the image processing apparatus 100 may also display a change button and an addition button. As the processing in step S295, the user may operate, for example, the change button displayed together with the image G2 to instruct a change to the image G3 or operate the addition button to instruct addition of the image G3. In response to this change instruction, the image processing apparatus 100 performs the display processing in step S275 again, whereby the image G2 is changed to the image G3 or the image G3 is added and all the images G1 to G4 are displayed. Note that, when the display is switched among the images G1 to G4 subjected to the color conversion and the physically-based rendering in advance, as indicated by a solid line in FIG. 15, the image processing apparatus 100 only has to perform the processing in step S275 after the display setting change processing in step S295. However, when a new printing profile is designated or a new texture parameter is designated by operation of the change button, as indicated by a broken line in FIG. 15, the image processing apparatus 100 returns to the color conversion in step S230 and performs the color conversion processing and the subsequent processing as in the case of the first embodiment (FIG. 8).

According to the second embodiment explained above, it is possible to achieve the same action effects as the action effects in the first embodiment. Further, it is possible to render the printing medium as the 3D object in the virtual space and indicate appearance of the image on the printing medium to the user in various forms in which the printing profile and the texture parameter are combined. Therefore, the user can understand how the appearance changes according to not only application and nonapplication of the printing profile but also considering and not considering the texture parameter. As a result, with the real view to which both of the printing profile and the texture parameter are applied, the user can check, through three-dimensional display in the virtual space, real appearance of an image printed on a selected printing medium. For example, when the position and the direction of the printing medium in the virtual space are changed or the position and the direction of the light source LG are changed using the pointing device or the like as illustrated in FIG. 6, the physically-based rendering is performed according to the change. Therefore, with the position of the light source LG and the texture, for example, the smoothness S of the printing medium, the user can check real appearance in which light of the light source LG is seen overlapping the image. Therefore, it is possible to save labor and time for actually printing the image on the printing medium every time.

Figure 17:
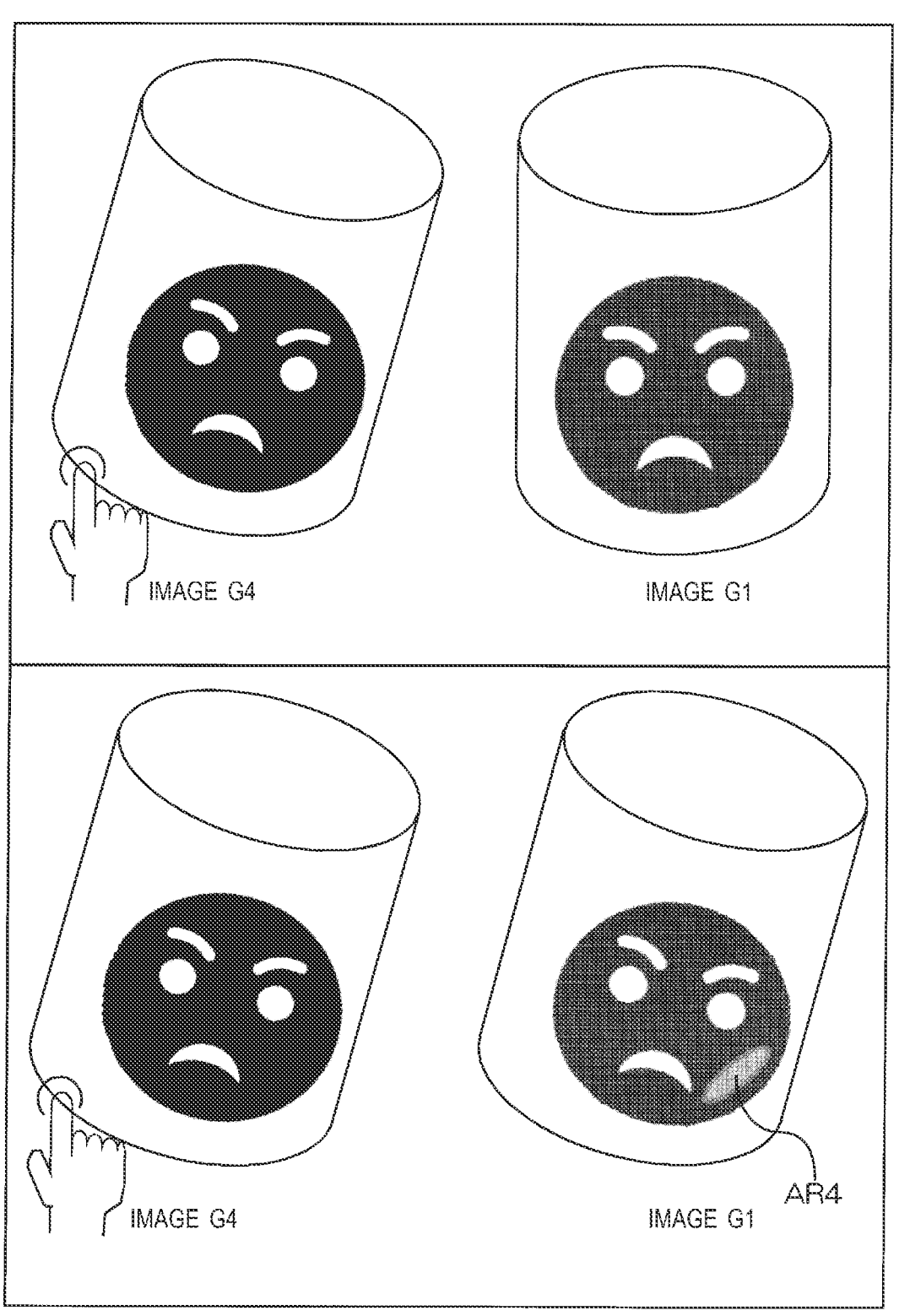
FIG. 17 is an explanatory diagram showing an example of a method of treating a plurality of images.

As shown in FIG. 6 in the first embodiment explained above, the position and the angle of the printing medium displayed on the image display unit 151 can be changed using the pointing device or the like. This is the same in the second embodiment. When the position and the angle of the printing medium are changed, since the rendering processing is performed again according to the change, the appearance of the printing medium on the image display unit 151 and the image printed on the surface of the printing medium is also changed. If a plurality of images are displayed on the image display unit 151 when the position and the angle of the printing medium are changed in this way, a change for one image may or may not be extended to the other images. For example, in the second embodiment, when the image G4 and the image G1 are juxtaposed and displayed, as illustrated in an upper part of FIG. 17, even if one image (here, the image G4) is rotated (or moved), the display of the other image may not be changed or, as illustrated in a lower part of FIG. 17, when one image is rotated, the other image may be rotated (or moved) in the same manner and displayed.

When such display is performed, in particular, as shown in the lower part, when one image is rotated or moved, a relation between the light source LG and the visual point VP in the virtual space changes. Therefore, in particular, as explained in the second embodiment, in the image generated by applying not only the printing profile MP but also the texture parameter TXT, it could occur that, for example, projection of the light source LG occurs in, for example, the printing medium, the smoothness of the surface of which is assumed to be high, because of the rotation or the movement of the printing medium. In the example shown in FIG. 17, as a result of rotating the image G4 subjected to the rendering without the texture parameter TXT applied thereto, the image G1 subjected to the rendering with the texture parameter TXT applied thereto also rotates and a region AR4 on which the light source LG is projected is seen. Therefore, the user can understand that it is accurately reproduced how the image G1 formed by performing the physically-based rendering taking into account even the texture parameter TXT is seen under the light source LG and can accurately check, for example, appearance of an image in the printing medium.

In the second embodiment, the appearance of the printing medium in the virtual space is determined not only with the printing profile MP but also with the combination of the printing profile MP and the texture parameter TXT. However, rather than directly designating the printing profile MP, as shown in FIG. 12 in the first embodiment, the printing profile MP may be designated from a combination of a type of a printing apparatus and a type of a printing medium. About the texture parameter TXT, it may be set whether texture parameters such as the smoothness S and the metallicity M and the normal map are collectively applied or it may be able to be set whether the parameters are applied one by one. Values of the smoothness S, the metallicity M, and the like may be able to be freely set according to a printing medium. In such a case, about the texture parameters, slide bars or dials may be displayed, the user may move the slide bars or the dials, and set degrees of the texture parameters. About all the parameters, assuming that the parameters are designated to numerical values of 0 to 1.0, the user may designate the numerical values.

C. Third Embodiment

Figure 18:
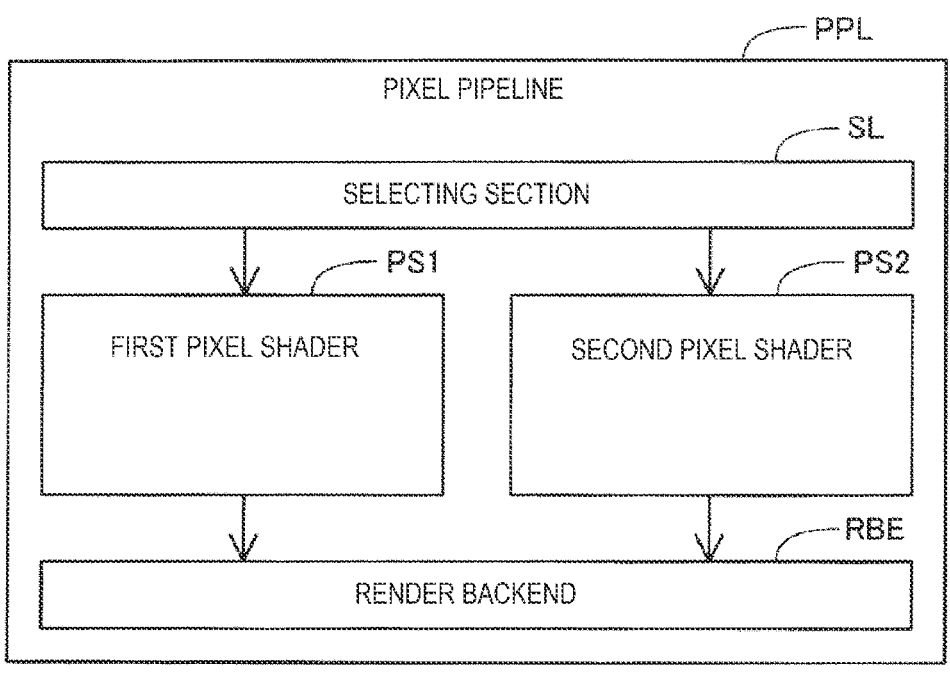
FIG. 18 is an explanatory diagram showing a configuration example in which a rendering executing unit includes a plurality of pixel shaders in a third embodiment.

The image processing apparatus 100 in a third embodiment has substantially the same hardware configuration as the hardware configuration in the first and second embodiments. However, the third embodiment is different from the first and second embodiments in that the pixel pipeline PPL of the rendering executing unit 121 includes two pixel shaders. The pixel pipeline PPL includes, as shown in FIG. 18, a first pixel shader PS1 and a second pixel shader PS2 and a selecting section SL for selecting which pixel shader is used. The pixel pipeline PPL may include three or more pixel shaders PS. When physically-based rendering is performed, for example, if different conditions are set for the printing profile MP and the texture parameter TXT used for color conversion, the pixel pipeline PPL is designated by the selecting section SL to use the pixel shader PS conforming to the set conditions. For example, the first pixel shader PS1 can be set as a pixel shader selected when the texture parameter TXT is not applied (is off) and the second pixel shader PS2 can be set as a pixel shader selected when the texture parameter TXT is applied (is on). When the texture parameter TXT is not applied, the calculation of the BRDF indicated by Expression (1) described above is not performed in the pixel shaders. Therefore, the rendering processing can be executed at high speed. Similarly, it is also effective to include a pixel shader exclusive for a specific printing medium. For example, one pixel shader can be configured to be used exclusively for a printing medium having high surface smoothness S like plastic and not to include parameters of a normal map and a height map or steps for processing the parameters. When the plastic is designated as the printing medium, an increase in speed of processing can be achieved if the pixel shader is designated by the selecting section SL. Besides such effects, the increase in processing speed may be achieved by configuring the pixel shader to cache content of the previous processing and using a cached processing result when the processing is designated again with the same condition setting. In the third embodiment, in addition to such action effects, the same action effects as the action effects in the first and second embodiments are also achieved.

D. Fourth Embodiment

Figure 19:
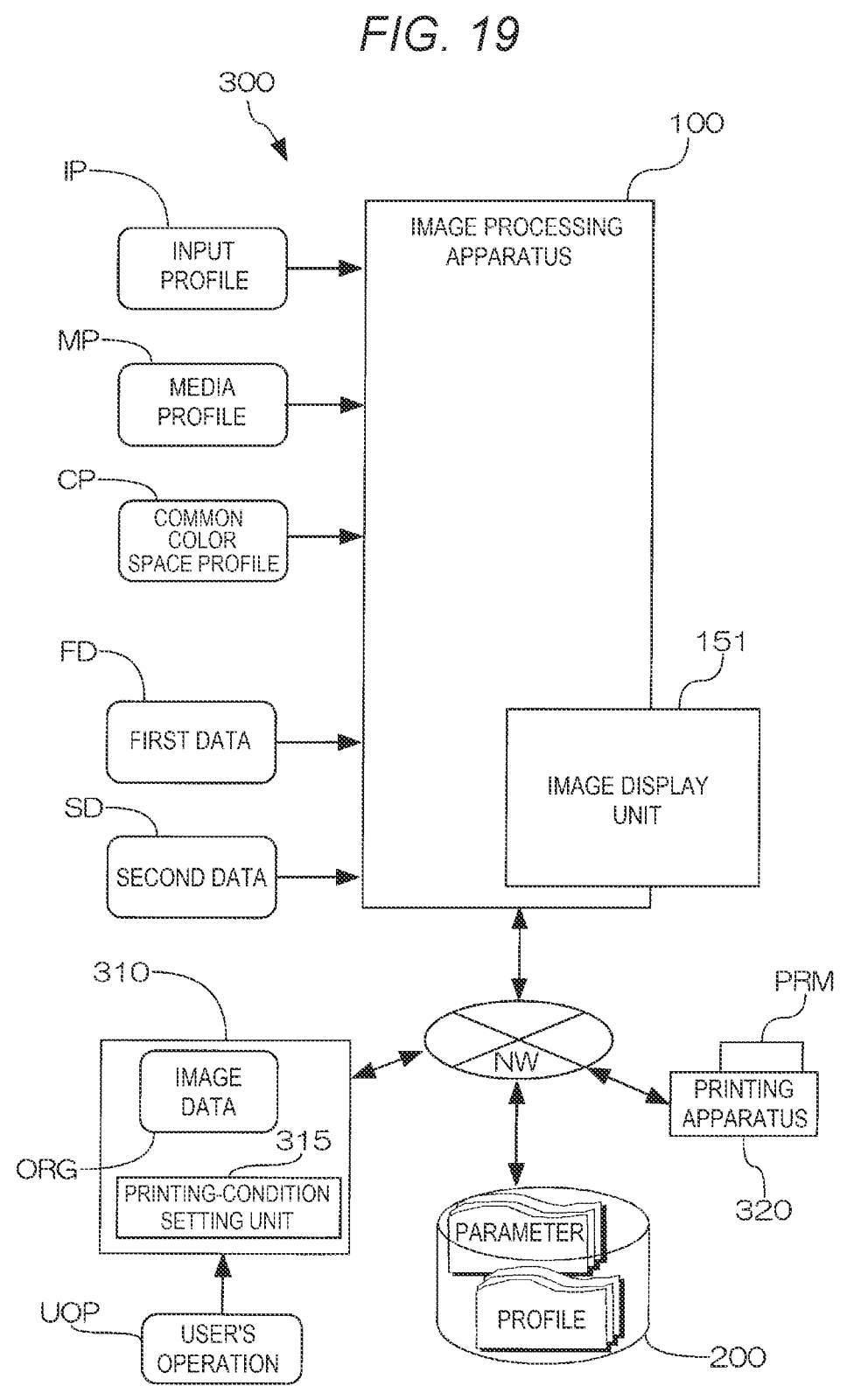

A fourth embodiment is a form as a printing system 300. The printing system 300 includes, as shown in FIG. 19, the image processing apparatus 100 explained above, an image preparation apparatus 310, and a printing apparatus 320. The image preparation apparatus 310 is, in this embodiment, a computer used by a user and is an apparatus that prepares the image data ORG, which is data of an image expressed in a first color space. The image preparation apparatus 310 may have a function of creating an image or may simply store image data and provide the image data to the image processing apparatus 100 according to necessity. The image preparation apparatus 310 is connected to the image processing apparatus 100 via the network NW like the site 200 such that the image processing apparatus 100 can acquire the image data ORG. However, the image preparation apparatus 310 may be directly connected to the image processing apparatus 100 by wire or radio.

In this embodiment, the printing apparatus 320 is connected to the image preparation apparatus 310 via the network NW. The printing apparatus 320 receives an instruction from the image preparation apparatus 310 and prints the image data ORG output by the image preparation apparatus 310 on a printing medium PRM. The user of the printing system 300 causes the image processing apparatus 100 to acquire the image data ORG prior to printing by the printing apparatus 320 and, as explained in the first embodiment, treats the printing medium PRM as a 3D object, performs lighting processing using the second data SD including a texture parameter, and renders the printing medium PRM including image data printed on the printing medium.

The user checks a result of the rendering on the image display unit 151 and, if necessary, changes the positions of a visual point and a light source, the intensity and a white balance of the light source, or the like, checks appearance of the printing medium PRM, and, thereafter, outputs the image data ORG from the image preparation apparatus 310 to the printing apparatus 320 via the network NW, and prints the image data ORG on the printing medium PRM. Prior to the printing, the user can check appearance of an image on the printing medium PRM through physically-based rendering by the image processing apparatus 100. As a result, the user can print the image after checking a difference in texture due to a type of the printing medium PRM including smoothness (roughness) of the surface of the printing medium PRM. Viewing a rendering result displayed on the image display unit 151, the user can change a color of the image data ORG, change a type of the printing medium PRM to be used, change the printing apparatus 320 used for the printing, or change an ink set of the printing apparatus 320 such that a desired printing result is obtained.

When the image processing apparatus 100 is used together with the printing apparatus 320 explained above, a printing-condition setting unit 315 that sets printing conditions affecting appearance on a printing medium of an image to be printed on the printing medium by the printing apparatus 320 may be included in a computer that instructs printing, for example, in thus embodiment, the image preparation apparatus 310. Consequently, printing conditions such as selection of a paper tray in which predetermined printing media are stored, selection of an ink set to be used, and selection of a type of a printing apparatus to be used can be received according to the user's operation UOP. The setting received by the printing-condition setting unit 315 is sent from the image preparation apparatus 310 to the printing apparatus 320. A profile necessary for color conversion can be set from the set printing conditions. First and second data to be referred to can be decided based on the printing conditions. Various kinds of setting can be easily realized. Besides these conditions, the printing-condition setting unit 315 may set, for example, an observation state of a printing medium, on which an image is printed, in a virtual space, illumination information, which is information concerning illumination for the printing medium in the virtual space, object specifying information for specifying a 3D object in the virtual space, background information for specifying a background in the virtual space.

Figure 20:
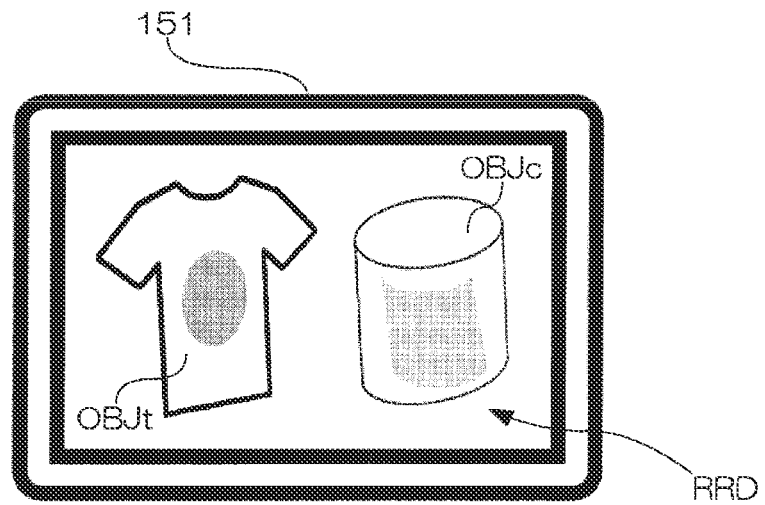
FIG. 20 is an explanatory diagram showing an example of appearance of a printing result on another printing medium.

The printing medium to be printed by the printing apparatus 320 may be a medium other than paper. The printing apparatus 320 may be, for example, a textile printer that prints on cloth or a printing apparatus that prints on a solid object such as a can or a bottle. Besides a configuration for directly printing on a target object, it is also possible to adopt a configuration of a printing apparatus that performs printing on a medium for transfer such as transfer paper and transfers ink formed on the medium for transfer onto cloth or a solid object, which is a printing medium. As such a printing apparatus of a transfer type, there is a printing apparatus of a sublimation type. In such a configuration of the transfer type, the printing medium is a final print on which the ink is transferred. In such a case, all what should be done is to prepare, according to characteristics of a printing medium, texture parameters and the like relating to the structure and the texture of the surface of cloth, metal, glass, plastic, or the like, which is the printing medium, and perform the physically-based rendering in the image processing apparatus 100. In the printing apparatus of the transfer type as well, as the texture parameters, texture parameters representing the texture of the final print rather than the medium for transfer are used. A display example in the image display unit 151 printed on cloth and a can is shown in FIG. 20. In FIG. 20, for convenience of understanding, an object OBJt printed on a T-shirt and an object OBJc printed on a can are shown together. However, usually, printing media are displayed one by one. Naturally, a plurality of rendering executing units may be prepared and a plurality of results of the physically-based rendering may be simultaneously displayed.

E. Other Embodiments (1) The present disclosure can be implemented in aspects described below. One of the aspects is an aspect as an image processing apparatus. The image processing apparatus includes: an image-data acquiring unit configured to acquire image data, which is data of an input image expressed in a first color space; a printing-profile acquiring unit configured to acquire a printing profile including a parameter relating to color development at a time when the image is printed; a propriety setting unit configured to set, when the image data is converted, using a color conversion profile prepared in advance, into expression in a second color space used in rendering, whether to apply the printing profile; a color conversion unit configured to perform color conversion according to the setting of the propriety of the printing profile and generate converted image data; a rendering executing unit configured to perform, using the converted image data and a parameter necessary to perform physically-based rendering using the printing medium as a 3D object, the physically-based rendering of a printed printing medium on which the image is printed and generate a rendering image corresponding to appearance in a virtual space of the printing medium on which the converted image data is printed; and a display unit configured to display the rendering image in a form in which a difference in the propriety of the printing profile can be compared. Consequently, the image processing apparatus displays, in a comparative form, a difference in the propriety of the printing profile including the parameter relating to the color development at the time when the image is printed. Therefore, a user can easily grasp a relation between the appearance of the image at the time when the image is printed and the printing profile even if the user does not perform trial printing every time. Therefore, a result of image processing by the image processing apparatus can be used as a reference for obtaining a desired printing result. Note that, when the color conversion unit uses the printing profile in the color conversion, the color conversion unit may be applied to perform conversion from a device independent color space into a device dependent color space and reverse conversion from the device dependent color space into the device independent color space. This makes it possible to convert, by reflecting the device dependent color space, the expression in the first color space into the expression in the second color space used in the rendering. If the device dependent color space is narrower than the device independent color space, it is possible to perform the rendering processing including limitation on a color value that occurs in actual printing. It is possible to bring the appearance closer to actual appearance. Naturally, the device depending color space may be wider.

Since the image processing apparatus performs the color conversion and the physically-based rendering, it is possible to accurately reproduce how the printing medium printed based on the image data is seen. For example, it is possible to freely calculate how the printing medium is seen according to various elements such as a position and an angle of a light source in viewing the printing medium, an angle of the printing medium surface with respect to a line of sight, and the texture of the surface such as gloss of the printing medium itself. Since a state of the image to be printed on the printing medium is subjected to the physically-based rendering, a problem in that, if conditions increases, combinations become enormously large and flexibility is lost does not occur. It is also possible to perform reproduction including the texture of the printing medium. That is, in such an image processing apparatus, since the printing medium is treated as the 3D object in the virtual space and the calculation is performed assuming that the printing data is printed on the printing medium, it is possible to calculate appearance of the image on the printing medium from various visual points and various angles. This makes it easy to adopt a configuration for performing correction of a tint and arrangement of image data. If a rendering image is shown considering characteristics of the printing medium, the influence of illumination, and the like, disagreement is prevented from occurring in an impression at the time when an image to be printed and the printing medium are combined. It is also possible to reduce work for adjusting an original image and printing conditions and repeating try and error. It is also possible to reduce expenses and time for trying printing.

The image processing apparatus explained above may be configured as an apparatus that performs only the image processing explained above or may be configured as an apparatus including a function of storing an image to be printed. Alternatively, the image processing apparatus may be configured as an apparatus including a function of creating an image to be printed or an apparatus that prints an image. The image processing apparatus may be implemented by a computer including a GPU or may be configured as a distributed system in which necessary functions are placed in a plurality of sites and can be associated. When the image processing apparatus is configured as the distributed system, since a processing load of a terminal is reduced, it is easy to execute the image processing explained above in a portable terminal such as a tablet terminal. Convenience of the user is further improved.

As the rendering executing unit explained above, existing various configurations can be adopted. In general, rendering may be implemented while being divided into a plurality of elements such as visual point conversion for converting a three-dimensional world coordinate into a coordinate system viewed from a visual point, culling for excluding vertexes unnecessary for the rendering from a 3D object, clipping for excluding invisible coordinates, and rasterizing. These kinds of processing may be configured to be suitable for processing in a dedicated GPU and may be implemented by a pipeline configuration including a vertex pipeline that performs processing concerning vertexes of the 3D object and a pixel pipeline that performs processing for rasterized pixels.

(2) In the configuration explained above, the image processing apparatus may include: a storage unit configured to store a plurality of kinds of the printing profile; and a printing-setting acquiring unit configured to acquire a printing apparatus that prints the image and printing setting concerning the printing in the printing apparatus. The printing-profile acquiring unit may acquire, according to the printing apparatus and the printing setting, the printing profile corresponding to the printing apparatus and the printing setting from the storage unit. This makes it possible to easily acquire the printing profile according to the printing apparatus and the printing setting. Naturally, the user may designate the printing profile by directly selecting a file that should be applied to the printing profile. In such a case, it is also preferable to display, at the top of choices, a printing profile designated in the past or a printing profile designated many times such that the printing profile can be preferentially selected.

(3) In the configurations of (1) and (2) explained above, the image processing apparatus may include a color conversion profile unit configured to perform at least one of acquisition and setting of the color conversion profile used for the color conversion of the image. As the color conversion profile, there are an input profile used for conversion from an equipment dependent color space to which the image to be printed belongs into a device independent color value and an output profile used for conversion from the device independent color value into a color space of equipment that performs output of an image. This makes it possible to easily acquire the color conversion profile such as the input profile or easily set the color conversion profile. Representative color conversion profiles only have to be stored in advance and a necessary color conversion profile only has to be acquired out of the representative color conversion profiles. Color conversion profiles not stored only have to be individually set.

(4) In the configurations of (1) to (3) explained above, the display unit may display, in displaying the rendering image, information of at least one of the color conversion profile and the printing profile. Consequently, the user can easily learn what kind of a color conversion profile was used to subject a displayed rendering image to the color conversion or what kind of a printing profile was used to subject the rendering image to the color conversion. The information of at least one of the color conversion profile and the printing profile may be always displayed near the rendering image by the display unit or may be popped-up and displayed when an image is clicked by a pointing device or when a cursor is placed on the image.

(5) In the configurations of (1) to (4) explained above, the display unit may display a rendering image corresponding to a converted image to which the printing profile is applied while adding the rendering image to or juxtaposing the rendering image with a rendering image corresponding to a converted image to which the printing profile is not applied. This makes it easy to compare the rendering image corresponding to the converted image to which the printing profile is applied and the rendering image corresponding to the converted image to which the printing profile is not applied. The two images may be juxtaposed and displayed from the beginning. One image may be displayed first and, in response to an addition instruction, the other image may be added to display both the images. Both the images do not always need to be juxtaposed and displayed and may be simply switched and displayed. This makes it possible to save a display space.

In the configurations of (1) to (5) explained above, the display unit may store, in an image memory, a rendering image corresponding to a converted image to which the printing profile is applied and a rendering image corresponding to a converted image to which the printing profile is not applied and display the rendering images according to an instruction. This makes it unnecessary to perform the physically-based rendering again after being instructed. It is possible to reduce a time until the display.

(7) In the configurations of (1) to (5) explained above, the color conversion unit may set, according to the setting of the propriety setting unit, as a target of the physically-based rendering by the rendering executing unit, converted image data to which the printing profile is applied and converted image data to which the printing profile is not applied. Consequently, the converted image data to which the printing profile is applied and the converted image data to which the printing profile is not applied only have to be subjected to the physically-based rendering when these converted image data are set. It is possible to reduce a time until a result of the rendering processing for one image data is displayed. If the rendering processing for image data not set is not performed, resources are not used for unnecessary processing.

(8) In the configurations of (1) to (7) explained above, the parameter used for the physically-based rendering by the rendering executing unit may include at least one of an illumination condition for illuminating the printing medium in the virtual space, an observation condition for observing the printing medium, and a texture condition relating to the texture of the printing medium. This makes it possible to perform the physically-based rendering including at least one of the illumination condition, the observation condition, the texture condition, and the like. It is possible to calculate appearance of the printing medium according to a variety of printing conditions.

(9) Another configuration of the present disclosure is a configuration as a printing system. The printing system includes: an image data preparation apparatus that prepares image data, which is data of an image expressed in a first color space; the image processing apparatus in (1) to (8) explained above that acquires the image data prepared by the image data preparation apparatus and performs image processing; and a printing apparatus that prints the image data. Consequently, when the printing apparatus performs printing, since appearance of a printing medium on which an image is printed is displayed on a display unit prior to the printing, it is possible to print the image after checking the appearance. Therefore, disagreement is prevented from occurring in impressions of the image to be printed and the printing medium. Work for adjusting an original image and printing conditions and repeating try and error is reduced. It is also possible to reduce expenses and time for trying printing.

(10) Another configuration of the present disclosure is a configuration as a non-transitory computer-readable storage medium storing an image processing program.

The image processing program is an image processing program for generating a rendering image of a printing medium on which an image is printed. The image processing program includes: a first function of acquiring image data, which is data of an input image expressed in a first color space; a second function of acquiring a printing profile including a parameter relating to color development at a time when the image is printed; a third function of setting, when the image data is converted, using a color conversion profile prepared in advance, into expression in a second color space used in rendering, whether to apply the printing profile; a fourth function of performing color conversion according to the setting of the propriety of the printing profile and generating converted image data; a fifth function of performing, using the converted image data and a parameter necessary to perform physically-based rendering using the printing medium as a 3D object, the physically-based rendering of a printed printing medium on which the image is printed and generating a rendering image corresponding to appearance in a virtual space of the printing medium on which the converted image data is printed; and a sixth function of displaying the rendering image in a form in which a difference in the propriety of the printing profile can be compared. This makes it possible to easily configure the image processing apparatus of (1) explained above in an apparatus including a computer.

(11) In the embodiments explained above, a part of components implemented by hardware may be replaced with software. Alternatively, at least a part of components implemented by software may be implemented by, for example, a discrete circuit configuration as components by hardware. When a part or all of the functions of the present disclosure are implemented by software, the software (a computer program) can be provided while being stored in a computer-readable recording medium. The "computer-readable recording medium" is not limited to portable recording media such as a flexible disk and a CD-ROM and includes various internal storage devices in a computer such as a RAM and a ROM and an external storage device fixed to the computer such as a hard disk. That is, the "computer-readable recording medium" has a broad meaning including any recording medium capable of non-transitorily fixing a data packet.

The present disclosure is not limited to the embodiments explained above and can be implemented in various configuration without departing from the gist of the present disclosure. For example, technical features in the embodiments corresponding to technical features in the aspects described in the summary can be substituted or combined as appropriate in order to solve a part or all of the problems described above or achieving a part or all of the effects described above. Unless the technical features are explained as essential technical features in this specification, the technical features can be deleted as appropriate.

What is claimed is:

1. An image processing apparatus that generates a rendering image of a printing medium on which an image is printed, the image processing apparatus comprising:
   a processor
      configured to acquire image data, which is data of an input image expressed in a first color space,
      configured to acquire a printing profile including a parameter relating to color development at a time when the image is printed, configured to set, when the image data is converted, using a color conversion profile prepared in advance, into expression in a second color space used in rendering, whether to apply the printing profile configured to perform color conversion according to the setting of the propriety of the printing profile and generate converted image data, configured to perform, using the converted image data and a parameter necessary to perform physically-based rendering using the printing medium as a 3D object, the physically-based rendering of a printed printing medium on which the image is printed and generate a rendering image corresponding to appearance in a virtual space of the printing medium on which the converted image data is printed; and a display configured to display the rendering image in a form in which a difference in the propriety of the printing profile can be compared, the parameter used for the physically-based rendering including at least one of an illumination condition for illuminating the printing medium in the virtual space, an observation condition for observing the printing medium, and a texture condition relating to texture of the printing medium, and the printing profile and the color conversion profile being different from each other and each being a data set separate from the parameter used for the physically-based rendering.

2. The image processing apparatus according to claim 1, further comprising:

a memory configured to store a plurality of kinds of the printing profile, the processor is further configured to acquire a printing apparatus that prints the image and printing setting concerning the printing in the printing apparatus, and configured to acquire, according to the printing apparatus and the printing setting, the printing profile corresponding to the printing apparatus and the printing setting from the memory.

3. The image processing apparatus according to claim 1, wherein the memory is configured to perform at least one of acquisition and setting of the color conversion profile used for the color conversion of the image.

4. The image processing apparatus according to claim 1, wherein the display displays, in displaying the rendering image, information of at least one of the color conversion profile and the printing profile.

5. The image processing apparatus according to claim 1, wherein the display displays a rendering image corresponding to a converted image to which the printing profile is applied while adding the rendering image to or juxtaposing the rendering image with a rendering image corresponding to a converted image to which the printing profile is not applied.

6. The image processing apparatus according to claim 1, wherein the display stores, in an image memory, a rendering image corresponding to a converted image to which the printing profile is applied and a rendering image corresponding to a converted image to which the printing profile is not applied and displays the rendering images according to an instruction.

7. The image processing apparatus according to claim 1, wherein the processor sets, according to the setting, as a target of the physically-based rendering, converted image data to which the printing profile is applied and converted image data to which the printing profile is not applied.

8. A printing system comprising:

an image data preparation apparatus that prepares image data, which is data of an image expressed in a first color space;

the image processing apparatus according to claim 1 that acquires the image data prepared by the image data preparation apparatus and performs image processing; and a printing apparatus that prints the image data.

9. A non-transitory computer-readable storage medium storing an image processing program for generating a rendering image of a printing medium on which an image is printed, the image processing program implementing, with a computer:

a first function of acquiring image data, which is data of an input image expressed in a first color space;

a second function of acquiring a printing profile including a parameter relating to color development at a time when the image is printed;

a third function of setting, when the image data is converted, using a color conversion profile prepared in advance, into expression in a second color space used in rendering, whether to apply the printing profile;

a fourth function of performing color conversion according to the setting of the propriety of the printing profile and generating converted image data;

a fifth function of performing, using the converted image data and a parameter necessary to perform physically-based rendering using the printing medium as a 3D object, the physically-based rendering of a printed printing medium on which the image is printed and generating a rendering image corresponding to appearance in a virtual space of the printing medium on which the converted image data is printed; and a sixth function of displaying the rendering image in a form in which a difference in the propriety of the printing profile can be compared, the parameter used for the physically-based rendering including at least one of an illumination condition for illuminating the printing medium in the virtual space, an observation condition for observing the printing medium, and a texture condition relating to texture of the printing medium, and the printing profile and the color conversion profile being different from each other and each being a data set separate from the parameter used for the physically-based rendering.

* * * * *